US011483189B2

(12) United States Patent
Gulati et al.

(10) Patent No.: US 11,483,189 B2
(45) Date of Patent: Oct. 25, 2022

(54) LIMITS FOR MODULATION AND CODING SCHEME VALUES

(71) Applicant: QUALCOMM Incorporated, San Diego, CA (US)

(72) Inventors: Kapil Gulati, Dover, DE (US); Tien Viet Nguyen, Bedminster, NJ (US); Sudhir Kumar Baghel, Hillsborough, NJ (US); Libin Jiang, Bridgewater, NJ (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/934,771

(22) Filed: Mar. 23, 2018

(65) Prior Publication Data

US 2018/0324010 A1   Nov. 8, 2018

Related U.S. Application Data

(60) Provisional application No. 62/501,664, filed on May 4, 2017.

(51) Int. Cl.
| | | |
|---|---|---|
| H04L 27/08 | (2006.01) | |
| H04L 1/00 | (2006.01) | |
| H04L 27/04 | (2006.01) | |
| H04L 27/26 | (2006.01) | |

(52) U.S. Cl.
CPC ............ *H04L 27/08* (2013.01); *H04L 1/0003* (2013.01); *H04L 1/0011* (2013.01); *H04L 1/0016* (2013.01); *H04L 1/0025* (2013.01); *H04L 27/04* (2013.01); *H04L 27/2627* (2013.01); *H04L 1/0009* (2013.01)

(58) Field of Classification Search
CPC combination set(s) only.
See application file for complete search history.

(56) References Cited

U.S. PATENT DOCUMENTS

| | | | |
|---|---|---|---|
| 9,307,549 B2 | 4/2016 | Fernando et al. | |
| 9,407,417 B2 | 8/2016 | Chen et al. | |
| 10,644,848 B2 | 5/2020 | Yun et al. | |
| 2003/0031122 A1 | 2/2003 | Kim et al. | |
| 2015/0085767 A1 | 3/2015 | Einhaus et al. | |

(Continued)

FOREIGN PATENT DOCUMENTS

| | | | |
|---|---|---|---|
| CN | 104115434 A | 10/2014 | |
| CN | 105164961 A | 12/2015 | |

(Continued)

OTHER PUBLICATIONS

3GPP TS 36.213 V14.2.0 (Mar. 2017) (Year: 2017), 253 Pages.

(Continued)

*Primary Examiner* — Sam K Ahn
*Assistant Examiner* — Amneet Singh
(74) *Attorney, Agent, or Firm* — Liem T. Do

(57) ABSTRACT

Various aspects of the disclosure relate to limits for modulation and coding scheme (MCS) values. For example, a first set of limits (e.g., minimum and maximum limits) may be used for a first MCS table and a second set of limits may be used for a second MCS table. The disclosure also relates in some aspects to inter-device signaling that indicates which minimum and maximum limits for an MCS table are to be used for communication between the devices.

19 Claims, 13 Drawing Sheets

(56) References Cited

U.S. PATENT DOCUMENTS

| | | | |
|---|---|---|---|
| 2015/0215068 A1 | 7/2015 | Wu | |
| 2015/0312071 A1* | 10/2015 | Chen | H04L 1/0003 370/329 |
| 2017/0048905 A1* | 2/2017 | Yun | H04W 76/14 |
| 2017/0142730 A1 | 5/2017 | Han et al. | |
| 2018/0279337 A1* | 9/2018 | Kwon | H04L 27/0008 |
| 2018/0323900 A1 | 11/2018 | Gulati et al. | |
| 2019/0174530 A1* | 6/2019 | Kim | H04W 4/40 |
| 2020/0053675 A1 | 2/2020 | Khoryaev et al. | |
| 2020/0163156 A1 | 5/2020 | Ye et al. | |

FOREIGN PATENT DOCUMENTS

| | | | |
|---|---|---|---|
| EP | 2787670 | A1 | 10/2014 |
| EP | 2903231 | A1 | 8/2015 |
| EP | 3145261 | A1 | 3/2017 |
| WO | 2014109915 | A1 | 7/2014 |
| WO | 2015048675 | A1 | 4/2015 |
| WO | 2015164251 | A1 | 10/2015 |
| WO | 2016015346 | A1 | 2/2016 |
| WO | 2016018187 | A1 | 2/2016 |
| WO | 2017029192 | A1 | 2/2017 |
| WO | 2017140344 | A1 | 8/2017 |

OTHER PUBLICATIONS

"3rd Generation Partnership Project;Technical Specification Group Radio Access Network;Evolved Universal Terrestrial Radio Access (E-UTRA);Services provided by the physical layer(Release 14)" 3GPP TS 36.302 V14.2.0 (Mar. 2017) (Year: 2017), 29 Pages.
"3rd Generation Partnership Project; Technical Specification Group Radio Access Network; 3GPP TS 36.331", Mar. 1, 2017, XP055481427, Retrieved from the Internet: URL:https://portal.3gpp.org/desktopmodules/Specifications/SpecificationDetails.aspx?specificationId=2440 [retrieved on Jun. 5, 2018], pp. 557-558.
Ericsson: "On 64QAM Modulation Operation for Sidelink Communications", 3GPP Draft; R1-1705780 Ericsson—On 64 QAM FOR REL-15 UES, 3rd Generation Partnership Project (3GPP), Mobile Competence Centre; 650, Route Des Lucioles; F-06921 Sophia-Antipolis Cedex; France, vol. RAN WG1 No. Spokane, USA; Apr. 3, 2017-Apr. 7, 2017 Apr. 2, 2017, XP051243894, Retrieved from the Internet: URL:http://www.3gpp.org/ftp/Meetings_3GPP_SYNC/RAN1/Docs/ [retrieved on Apr. 2, 2017], 3 pages.
International Search Report and Written Opinion—PCT/US2018/024340—ISA/EPO—dated Jun. 22, 2018.
LG Electronics: "Discussion about Single Link Demodulation Requirements for Rel-14 V2V", 3GPP Draft; R4-1702103 V2V Singlelink, 3rd Generation Partnership Project (3GPP), Mobile Competence Centre; 650, Route Des Lucioles; F-06921 Sophia-Antipolis Cedex; France, vol. RAN WG4, No. Athens, Greece; Feb. 13, 2017-Feb. 17, 2017, Feb. 21, 2017, XP051237881, Retrieved from the Internet: URL:http://www.3gpp.org/ftp/tsg ran/WG4_Radio/TSGR4_82/Docs/ [retrieved on Feb. 21, 2017], 3 pages.
Panasonic: "MCS in Mode 1 in D2D", 3GPP Draft; R1-143001, 3rd Generation Partnership Project (3GPP), Mobile Competence Centre; 650, Route Des Lucioles; F-06921 Sophia-Antipolis Cedex; France, vol. RAN WG1, No. Dresden, Germany; Aug. 18, 2014-Aug. 22, 2014, Aug. 17, 2014, XP050788481, Retrieved from the Internet: URL:http://www.3gpp.org/ftp/Meetings_3GPP_SYNC/RAN1/Docs/ [retrieved on Aug. 17, 2014], 3 pages.
Qualcomm Incorporated: "Support of 64-QAM for 3GPP V2X Phase 2", 3GPP Draft; R1-1713031, 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017 Aug. 20, 2017, XP051315840, Retrieved from the Internet: URL:http://www.3gpp.org/ftp/Meetings_3GPP_SYNC/RAN1/Docs/ [retrieved on Aug. 20, 2017], 7 pages.
Huawei et al: "Coexistence of R14 UEs and R15 UEs regarding 64QAM and Tx diversity", vol. RAN WG2, No. Athens, Greece; Feb. 26, 2018-Mar. 2, 2018, Feb. 15, 2018 (Feb. 15, 2018), XP051399375, Retrieved from the Internet <URL:http://www.3gpp.org/tsg_ran/WG2_RL2/TSGR2_101/Docs/R2-1801904 Coexistence of R14 UEs and R15 UEs regarding 64QAM and Tx diversity. doc> [retrieved on Feb. 15, 2018], 4 pages.
"LTE; Evolved Universal Terrestrial Radio Access (E-UTRA); Physical Channels and Modulation (3GPP TS 36.211 version 13.5.0 Release 13)", ETSI TS 136 211, V13.5 0, Apr. 2017, 173 Pages.
U.S. Appl. No. 62/476,039, filed 2017.
U.S. Appl. No. 62/476,083, filed 2017.
U.S. Appl. No. 62/476,417, filed 2017.
3GPP TS 36.331 V14.2.0, 3rd Generation Partnership Project, Technical Specification Group Radio Access Network, Evolved Universal Terrestrial Radio Access (E-UTRA) Radio Resource Control (RRC), Protocol specification (Release 14), Mar. 2017, 8 Pages (pp. 552-558).
"3rd Generation Partnership Project, Technical Specification Group Radio Access Network, Evolved Universal Terrestrial Radio Access (E-UTRA); Radio Resource Control (RRC); Protocol Specification (Release 14)", 3GPP Standard, Technical Specification 3GPP TS 36.331 V14.2.2, (Apr. 2017) Apr. 20, 2017, 721 Pages.
Taiwan Search Report—TW107110230—TIPO—dated Jan. 3, 2022.

* cited by examiner

LIMITS FOR MODULATION AND CODING SCHEME VALUES

CROSS-REFERENCE TO RELATED APPLICATION(S)

This application claims priority to and the benefit of provisional patent application No. 62/501,664 filed in the U.S. Patent and Trademark Office on May 4, 2017, the entire content of which is incorporated herein by reference.

INTRODUCTION

Various aspects described herein relate to wireless communication and more particularly, but not exclusively, to limits for modulation and coding scheme (MCS) values.

Wireless communication networks are widely deployed to provide various communication services such as telephony, video, data, messaging, broadcasts, and so on. Such networks, which are usually multiple access networks, support communication for multiple users by sharing the available network resources.

In general, channel conditions may affect reception at a wireless communication device. In view of this and other factors, communication parameters such as modulation and coding scheme (MCS) may be selected in an attempt to maximize wireless communication performance. Thus, there is a need for effective techniques to select an MCS to improve wireless communication performance.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides a method of communication including: determining a first minimum value and a first maximum value for a first set of modulation and coding scheme (MCS) values defined for peer-to-peer communication between a first device and a second device; determining a second minimum value and a second maximum value for a second set of MCS values defined for the peer-to-peer communication; and sending the first minimum value, the first maximum value, the second minimum value, and the second maximum value to the first device.

In some aspects, the disclosure provides an apparatus for communication, including a memory and a processor coupled to the memory. The processor and the memory are configured to: determine a first minimum value and a first maximum value for a first set of modulation and coding scheme (MCS) values defined for peer-to-peer communication between a first device and a second device; determine a second minimum value and a second maximum value for a second set of MCS values defined for the peer-to-peer communication; and send the first minimum value, the first maximum value, the second minimum value, and the second maximum value to the first device.

In some aspects, the disclosure provides an apparatus configured for communication. The apparatus including: means for determining a first minimum value and a first maximum value for a first set of modulation and coding scheme (MCS) values defined for peer-to-peer communication between a first device and a second device; means for determining a second minimum value and a second maximum value for a second set of MCS values defined for the peer-to-peer communication; and means for sending the first minimum value, the first maximum value, the second minimum value, and the second maximum value to the first device.

In some aspects, the disclosure provides a non-transitory computer-readable medium storing computer-executable code, including code to: determine a first minimum value and a first maximum value for a first set of modulation and coding scheme (MCS) values defined for peer-to-peer communication between a first device and a second device; determine a second minimum value and a second maximum value for a second set of MCS values defined for the peer-to-peer communication; and send the first minimum value, the first maximum value, the second minimum value, and the second maximum value to the first device.

In some aspects, the disclosure provides a method of communication including: identifying a set of modulation and coding scheme (MCS) values from a plurality of sets of MCS values to use for communication with another apparatus; identifying a set of minimum and maximum values from a plurality of sets of minimum and maximum values to use with the identified set of MCS values; and communicating with another apparatus, wherein the communication uses the identified set of MCS values and the identified set of minimum and maximum values.

In some aspects, the disclosure provides an apparatus for communication, including a memory and a processor coupled to the memory. The processor and the memory are configured to: identify a set of modulation and coding scheme (MCS) values from a plurality of sets of MCS values to use for communication with another apparatus; identify a set of minimum and maximum values from a plurality of sets of minimum and maximum values to use with the identified set of MCS values; and communicate with another apparatus, wherein the communication uses the identified set of MCS values and the identified set of minimum and maximum values.

In some aspects, the disclosure provides an apparatus configured for communication. The apparatus including: means for identifying a set of modulation and coding scheme (MCS) values from a plurality of sets of MCS values to use for communication with another apparatus; means for identifying a set of minimum and maximum values from a plurality of sets of minimum and maximum values to use with the identified set of MCS values; and means for communicating with another apparatus, wherein the communication uses the identified set of MCS values and the identified set of minimum and maximum values.

In some aspects, the disclosure provides a non-transitory computer-readable medium storing computer-executable code, including code to: identify a set of modulation and coding scheme (MCS) values from a plurality of sets of MCS values to use for communication with another apparatus; identify a set of minimum and maximum values from a plurality of sets of minimum and maximum values to use with the identified set of MCS values; and communicate with another apparatus, wherein the communication uses the identified set of MCS values and the identified set of minimum and maximum values.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Figure 1:
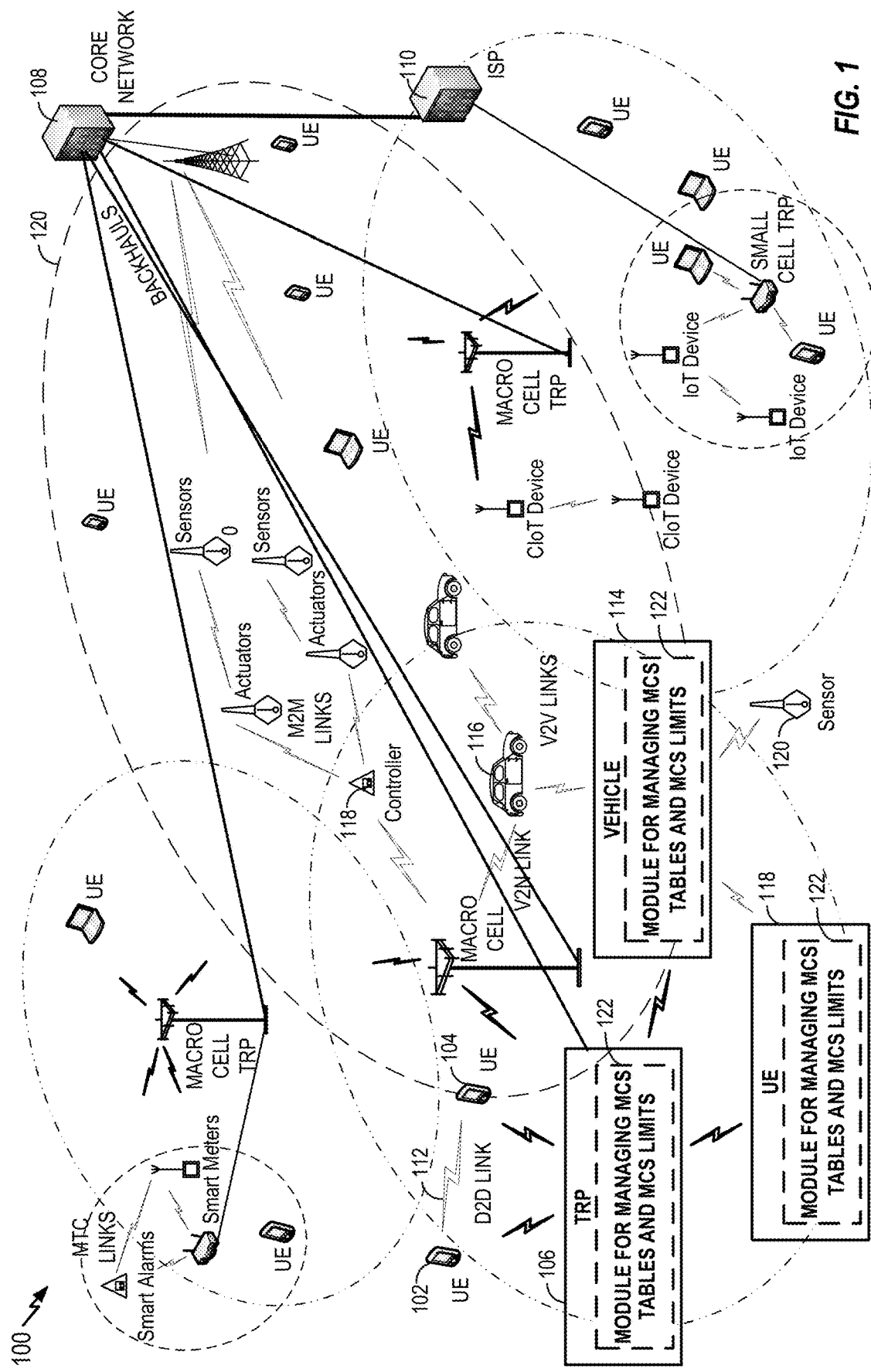
FIG. 1 is a diagram of an example communication system in which aspects of the disclosure may be used.

Various aspects of the disclosure relate to the use of multiple MCS tables. For example, a first MCS table may be used for a first condition and a second MCS table used for a second condition. The disclosure relates in some aspects to signaling between devices that indicates which table is to be used for communication between the devices. The disclosure relates in some aspects to signaling between devices that indicates which minimum and maximum limits for an MCS table are to be used for communication between the devices.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. Moreover, alternate configurations may be devised without departing from the scope of the disclosure. Additionally, well-known elements will not be described in detail or will be omitted so as not to obscure the relevant details of the disclosure.

The various concepts presented throughout this disclosure may be implemented across a broad variety of telecommunication systems, network architectures, and communication standards. For example, the 3rd Generation Partnership Project (3GPP) is a standards body that defines several wireless communication standards for networks involving the evolved packet system (EPS), frequently referred to as long-term evolution (LTE) networks. Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Thus, the teachings herein can be implemented according to various network technologies including, without limitation, 5G technology, fourth generation (4G) technology, third generation (3G) technology, and other network architectures. Also, the techniques described herein may be used for a downlink, an uplink, a peer-to-peer link, or some other type of link.

The actual telecommunication standard, network architecture, and/or communication standard used will depend on the specific application and the overall design constraints imposed on the system. For purposes of illustration, the following may describe various aspects in the context of a 5G system and/or an LTE system. It should be appreciated, however, that the teachings herein may be used in other systems as well. Thus, references to functionality in the context of 5G and/or LTE terminology should be understood to be equally applicable to other types of technology, networks, components, signaling, and so on.

Example Communication System

FIG. 1 illustrates an example of a wireless communication system 100 where a user equipment (UE) can communicate with other devices via wireless communication signaling. For example, a first UE 102 and a second UE 104 may communicate with a transmit receive point (TRP) 106 using wireless communication resources managed by the TRP 106 and/or other network components (e.g., a core network 108, an internet service provider (ISP) 110, peer devices, and so on). As indicated, the UEs 102 and 104 may communicate with each other directedly via a device-to-device (D2D) link 112.

In some scenarios, a D2D link may be a vehicle-to-anything (V2X) link. For example, a first vehicle 114 may communicate via some form (or forms) of V2X communication with a second vehicle 116, a UE 118, a sensor 120, the TRP 106, or some other component (e.g., device) of the wireless communication system 100.

In accordance with the teachings herein, these devices may include functionality for management of MCS tables and MCS limits. For example, each of the first vehicle 114, the second vehicle 116, the UE 118, the sensor 120, the UE 102, the UE 104, and the TRP 106 (as well as other devices in the system 100) may include a module for managing a MCS tables and MCS limits 122 for controlling D2D, V2X, and similar communication in the system 100. To reduce the complexity of FIG. 1, the module for managing a MCS tables and MCS limits 122 is only shown for the first vehicle 114, the UE 118, and the TRP 106.

The components and links of the wireless communication system 100 may take different forms in different implementations. For example, and without limitation, UEs may be cellular devices, Internet of Things (IoT) devices, cellular IoT (CIoT) devices, LTE wireless cellular devices, machine-type communication (MTC) cellular devices, smart alarms, remote sensors, smart phones, mobile phones, smart meters, personal digital assistants (PDAs), personal computers, mesh nodes, and tablet computers.

In some aspects, a TRP may refer to a physical entity that incorporates radio head functionality for a particular physical cell. In some aspects, the TRP may include 5G new radio (NR) functionality with an air interface based on orthogonal frequency division multiplexing (OFDM). NR may support, for example and without limitation, enhanced mobile broadband (eMBB), mission-critical services, and wide-scale deployment of IoT devices. The functionality of a TRP may be similar in one or more aspects to (or incorporated into) the functionality of a CIoT base station (C-BS), a NodeB, an evolved NodeB (eNodeB), radio access network (RAN) access node, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other suitable entity. In different scenarios (e.g., NR, LTE, etc.), a TRP may be referred to as a gNodeB (gNB), an eNB, a base station, or referenced using other terminology.

Various types of network-to-device links and D2D links may be supported in the wireless communication system 100. For example, D2D links may include, without limitation, machine-to-machine (M2M) links, MTC links, vehicle-to-vehicle (V2V) links, and vehicle-to-anything (V2X) links. Network-to-device links may include, without limitation, uplinks (or reverse links), downlinks (or forward links), and vehicle-to-network (V2N) links.

Example Communication Components

Figure 2:
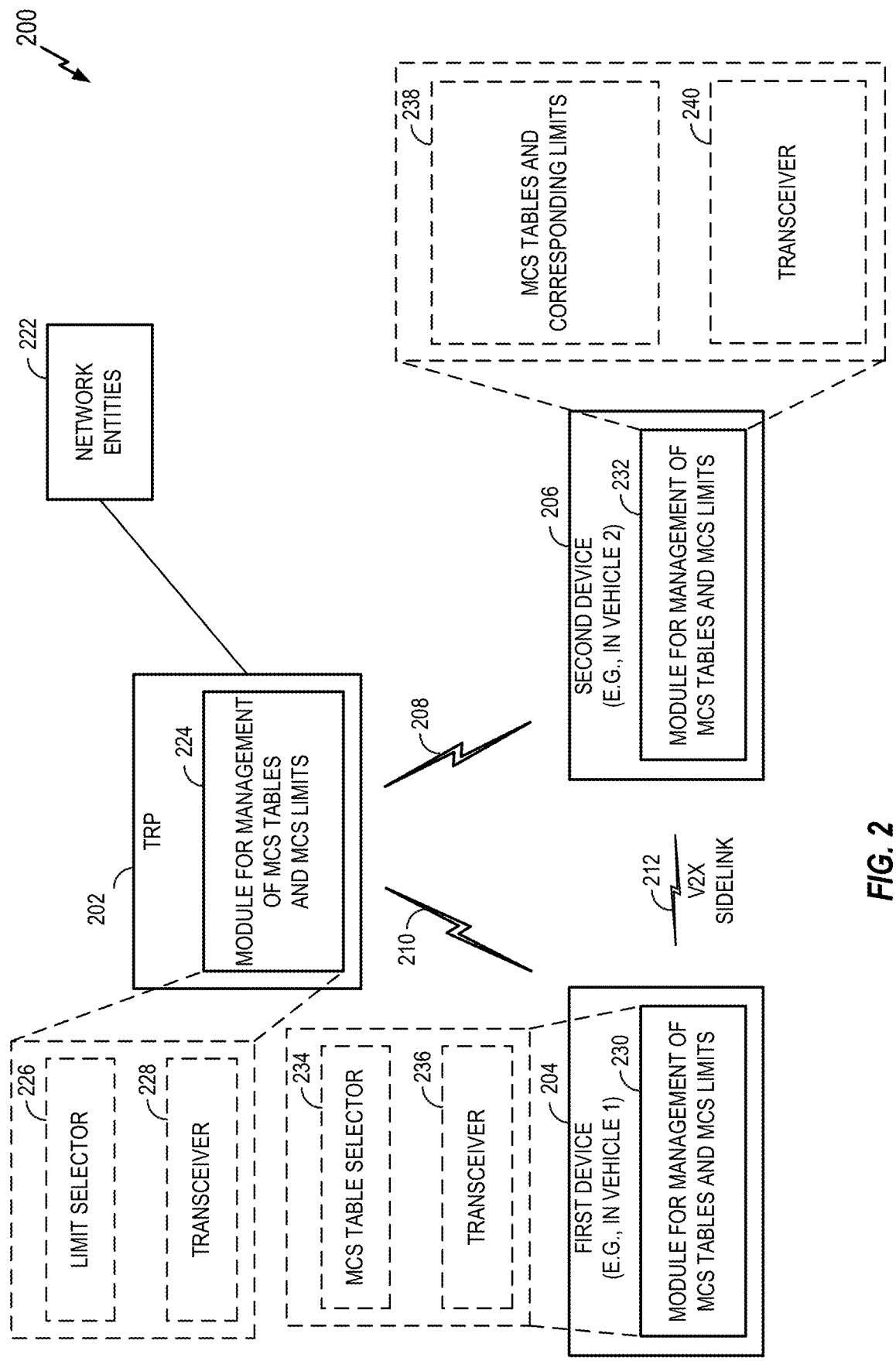
FIG. 2 is a block diagram of example communication components in accordance with some aspects of the disclosure.

FIG. 2 illustrates another example of a wireless communication system 200 where devices communicate via V2X sidelinks or some other suitable communication link (e.g., D2D links). For example, a transmit receive point (TRP) 202 may communicate with a first device 204 and a second device 206 via a first link 208 and a second link 210, respectively (e.g., V2X links). In addition, the first device 204 and the second device 206 may communicate via a V2X link 212.

The devices of the wireless communication system 200 may access other communication devices of a wide area network (e.g., via network entities 222) or access communication devices in other networks (not shown). To reduce the complexity of FIG. 2, only a TRP and two devices are shown. In practice, a wireless communication system may include more of these devices and other devices. In some implementations, the TRP 202 may correspond to the TRP 106 of FIG. 1. In addition, the first device 204 and the second device 206 may correspond to the first vehicle 114 and the second vehicle 116 of FIG. 1, respectively.

Communication on the V2X links may use an MCS table. Accordingly, some of the components of the wireless communication system 200 may include functionality for managing MCS tables. For example, the TRP 202 may include a module for management of MCS tables and MCS limits 224. In some aspects, the module for management of MCS tables and MCS limits 224 may include a limit selector 226 for selecting minimum and maximum limits for MCS tables 226. The TRP 202 may send these limits to the first device 204 and the second device 206 via a transceiver 228.

The first device 204 and the second device 206 may also include functionality for managing MCS tables and MCS limits. For example, the first device may include a module for management of MCS tables and MCS limits 230 and the second device may include a module for management of MCS tables and MCS limits 232. The module for management of MCS tables and MCS limits 230 may include an MCS table selector 234 for selecting an MCS table from a set of MCS tables to use for communication over the V2X sidelink 212. The first device 204 may send an indication of the selected MCS table to the second device 206 via a transceiver 236. The module for management of MCS tables and MCS limits 232 may manage MCS tables and corresponding limits 238 that the second device 206 receives from the first device 204 and/or the TRP 202. For example, the first device 204 may identify which MCS table is to be to used and the TRP 202 may provide a set of minimum and maximum values (e.g., a set of at least one minimum value and at least one maximum value) to be used for different MCS tables. A transceiver 240 of the second device 206 may then use this information to select the appropriate rate, etc., for the communication over the V2X sidelink 212. Also, other devices of the wireless communication system 200 may include similar functionality (not shown).

MCS Tables

A wireless communication system might support up to a specified maximum modulation order. For example, 3GPP Technical Specification Group (TSG) Radio Access Network (RAN) Release 14 (hereafter simply referred to as Rel.-14) specifies that sidelink communication may use a legacy uplink (UL) MCS table that supports up to 16 QAM. This MCS table includes 5 bits for the MCS Index (MCS-0 through MCS-28 are usable), with an additional constraint that the modulation order is set as Qm=min(4, Qm'). This constraint limits the MCS Table to 16 QAM. Qm' is the modulation order indicated in the Table 1 below (Table 1 is a reproduction of Table 8.6.1-1 in 3GPP Rel.-14 36.213). TBS stands for transport block size.

TABLE 1

MCS TABLE

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |

TABLE 1-continued

MCS TABLE

| MCS Index $I_{MCS}$ | Modulation Order $Q_m$ | TBS Index $I_{TBS}$ |
|---|---|---|
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

3GPP TSG RAN Release 15 (hereafter simply referred to as Rel.-15) is proposing use of 64 QAM for a physical sidelink shared channel (PSSCH). One way to implement 64 QAM is to use the legacy UL MCS table, but allow 64 QAM by removing the Qm=min (4, Qm') constraint. In accordance with the teachings here, a transmitter may send an additional bit in the control channel to indicate whether Qm=min (4, Qm') should be applied or not at a receiver.

Figure 3:
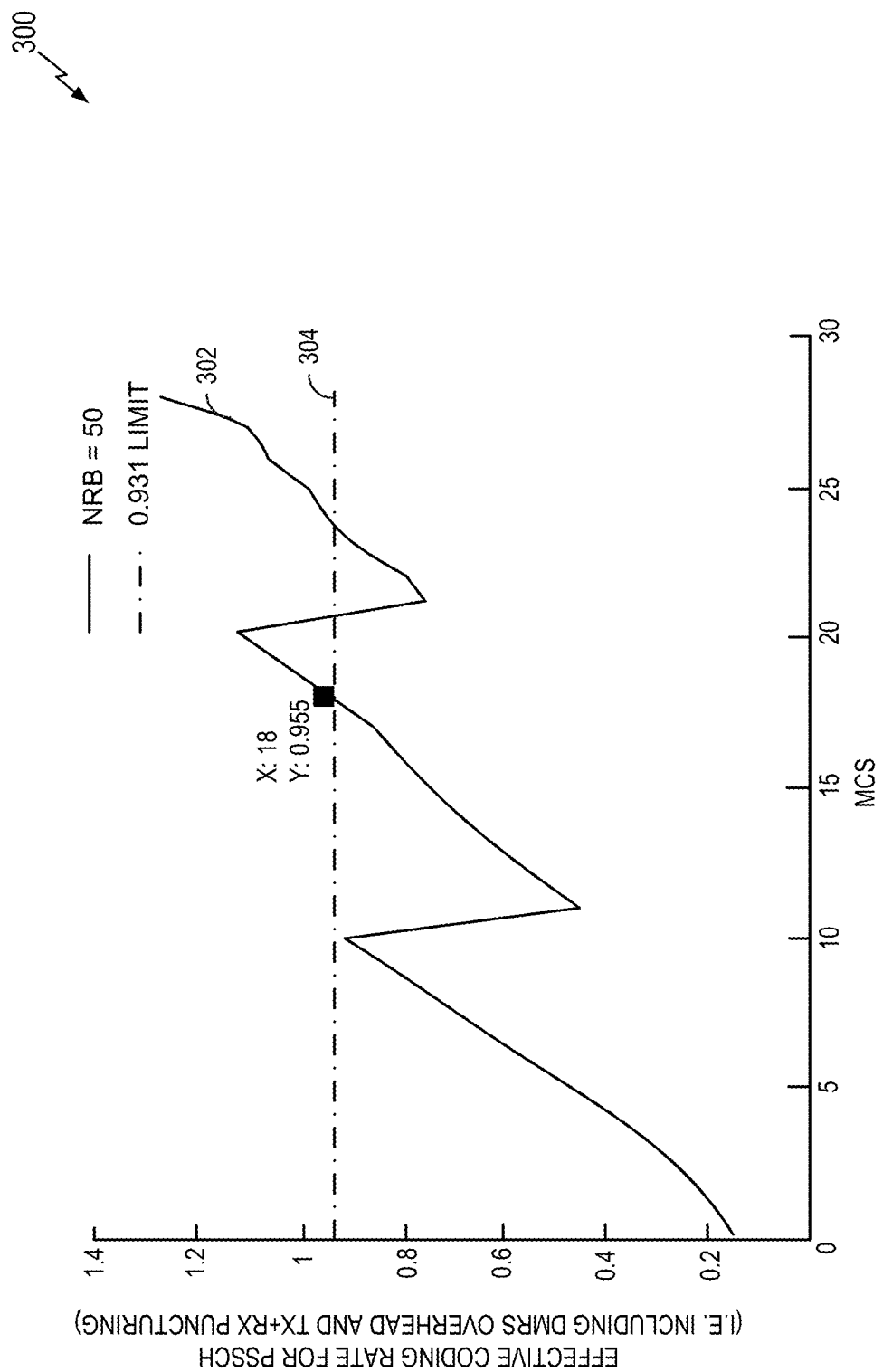
FIG. 3 is a plot of an example of effective coding rate versus MCS.

There is another issue for a V2X PSSCH that arises due to overhead in PSSCH being higher as compared to the overhead in the legacy physical uplink shared channel (PUSCH) that uses the legacy UL MCS table. For example, the overhead for V2X PSSCH transmission may be 4 demodulation reference symbols (referred to herein as DMRS symbols), plus the last symbol punctured for a transmit/receive turnaround, plus one symbol that may potentially be punctured at the receiver for automatic gain control (AGC). In contrast, the overhead for the UL PUSCH may be 2 DMRS symbols. Thus, PSSCH may use up to six symbols while PUSCH only uses two symbols. This results in a coding rate greater than a desired threshold level for certain MCSs. For example, FIG. 3 depicts a graph 300 that plots the effective coding rate for PSSCH versus MCS. The graph 300 corresponds to the example above where the overhead for the PSCCH transmission may be 4 DMRS symbols. In FIG. 3, the coding rate is represented by the solid line 302. The dashed horizontal line 304 represents a coding rate limit of 0.931 (e.g., above which a receiver might not be required to decode a received signal). For example, for an MCS index value of 18, the effective coding rate is 0.955. While some 16 QAM MCS points are affected as indicated in FIG. 3, the problem is more dominant for the 64 QAM MCS points (MCS index values of 21 and higher).

MCS Table Selections and Associated Limits

Figure 4:
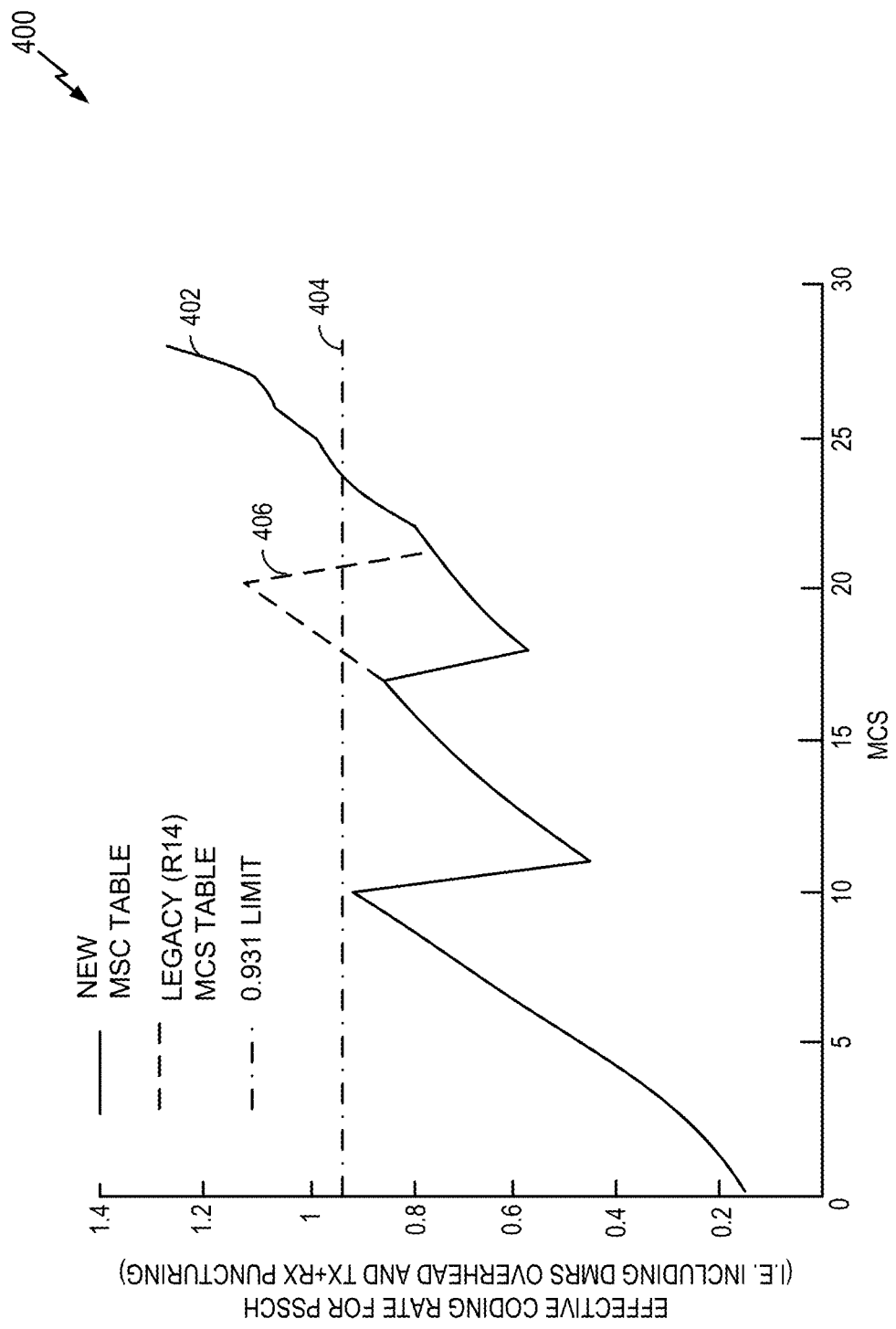
FIG. 4 is a plot of an example of effective coding rate versus MCS in accordance with some aspects of the disclosure.

The disclosure relates in some aspects to using an additional MCS table such that a device can switch from 16 QAM to 64 QAM under certain conditions. For example, a switch to 64 QAM may be made when the effective code rate for PSSCH exceeds a threshold value (e.g., 0.931) for 16 QAM (accounting for the additional overhead compared to UL PUSCH for which the MCS table was originally designed). Thus, two tables as set forth below (Table 2 and Table 3) may be used by transmitting devices (e.g., UEs) for Rel.-15 systems or other wireless communication systems. Here, it may be seen that 64 QAM is now designated for MCS Indices 18, 19, and 20 in Table 3. FIG. 4 depicts a graph 400 that plots the effective coding rate for PSSCH versus MCS when these two MCS tables are used (e.g., a UE elects to use one of the two tables at a given time based on current conditions or some other factor). The coding rate is represented by the solid line 402. The dashed horizontal line 404 represents a coding rate limit of 0.931 The partial dashed line 406 shows the corresponding part of this plot from FIG. 3 (illustrating the problem with use of the legacy MCS table).

The disclosure thus relates in some aspects to a device (e.g., a UE) that indicates in Sidelink control which MCS mapping table is to be used for the Sidelink data communication indicated in the Sidelink control. In one case, one bit is used to indicate the choice between two tables. In one case, the transmitter sets this bit based on the modulation order used for the Sidelink data.

TABLE 2

R-14 MCS TABLE

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 4 | 17 |
| 19 | 4 | 18 |
| 20 | 4 | 19 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

For Rel.-14, Qm = min(4, Qm')

TABLE 3

ADDITIONAL MCS TABLE

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |

TABLE 3-continued

ADDITIONAL MCS TABLE

| MCS Index $I_{MCS}$ | Modulation Order $Q_m$ | TBS Index $I_{TBS}$ |
| --- | --- | --- |
| 5 | 2 | 5 |
| 6 | 2 | 6 |
| 7 | 2 | 7 |
| 8 | 2 | 8 |
| 9 | 2 | 9 |
| 10 | 2 | 10 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 4 | 16 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |

The disclosure also relates in some aspects to providing a device (e.g., a UE) with a configuration (e.g., a Radio Resource Control, RRC, configuration) indicative of the corresponding MCS minimum and maximum limits to be used for the two MCS mapping tables.

For V2X, a UE may be configured (e.g., preconfigured) with limits on the MCS as a function of the speed of the UE and/or as a function of the congestion measured in the system. Some systems may use the MCS limits (configured via an RRC configuration) set forth in Table 4. Here, minMCS-PSSCH-r14 and maxMCS-PSSCH-r14 can each have a value from 0 to 31.

TABLE 4

```
SL-PSSCH-TxParameters-r14 ::=      SEQUENCE {
    minMCS-PSSCH-r14               INTEGER (0..31),
    maxMCS-PSSCH-r14               INTEGER (0..31),
    minRB-NumberPSSCH-r14          INTEGER (1..100),
    maxRB-NumberPSSCH-r14          INTEGER (1..100),
    allowedRetxNumberPSSCH-r14     ENUMERATED {n0, n1, both,
                                   spare1},
    maxTxPower-r14                 SL-TxPower-r14
    OPTIONAL                       -- Cond CBR
}
```

The configuration of Table 4 may be used for speed dependent transmission parameters (e.g., SL-PSSCH-TxConfig-r14) and a congestion control configuration (e.g., SL-CBR-PSSCH-TxConfigList-r14).

With the introduction of an additional MCS table as taught herein, a technique for identifying how to interpret the minimum and maximum MCS configuration follows (e.g., using an Rel.-14 MCS table or an Rel.-15 MCS table). Further, since a Rel.-15 UE could use either of the two MCS tables (e.g., Table 2 and Table 3 discussed above), a configuration is provided for each of the MCS tables as shown in Table 5 below. Here, minMCS-PSSCH-r14 and maxMCS-PSSCH-r14 hold the minimum limit and the maximum limit, respectively, for Rel.-14 (e.g., Table 2), while minMCS-PSSCH-r15 and maxMCS-PSSCH-r15 hold the minimum limit and the maximum limit, respectively, for Rel.-15 (e.g., Table 3).

TABLE 5

```
SL-PSSCH-TxParameters-r14 ::=      SEQUENCE {
    minMCS-PSSCH-r14               INTEGER (0..31),
    -- In relation to R-14 MCS table
    maxMCS-PSSCH-r14               INTEGER (0..31),
    -- In relation to R-14 MCS table
    minMCS-PSSCH-r15               INTEGER (0..31),
    -- In relation to R-15 MCS table
    maxMCS-PSSCH-r15               INTEGER (0..31),
    -- In relation to R-15 MCS table
    minRB-NumberPSSCH-r14          INTEGER (1..100),
    maxRB-NumberPSSCH-r14          INTEGER (1..100),
    allowedRetxNumberPSSCH-r14     ENUMERATED {n0, n1, both,
                                   spare1},
    maxTxPower-r14                 SL-TxPower-r14
    OPTIONAL                       -- Cond CBR
}
```

Example Operations

Figure 5:
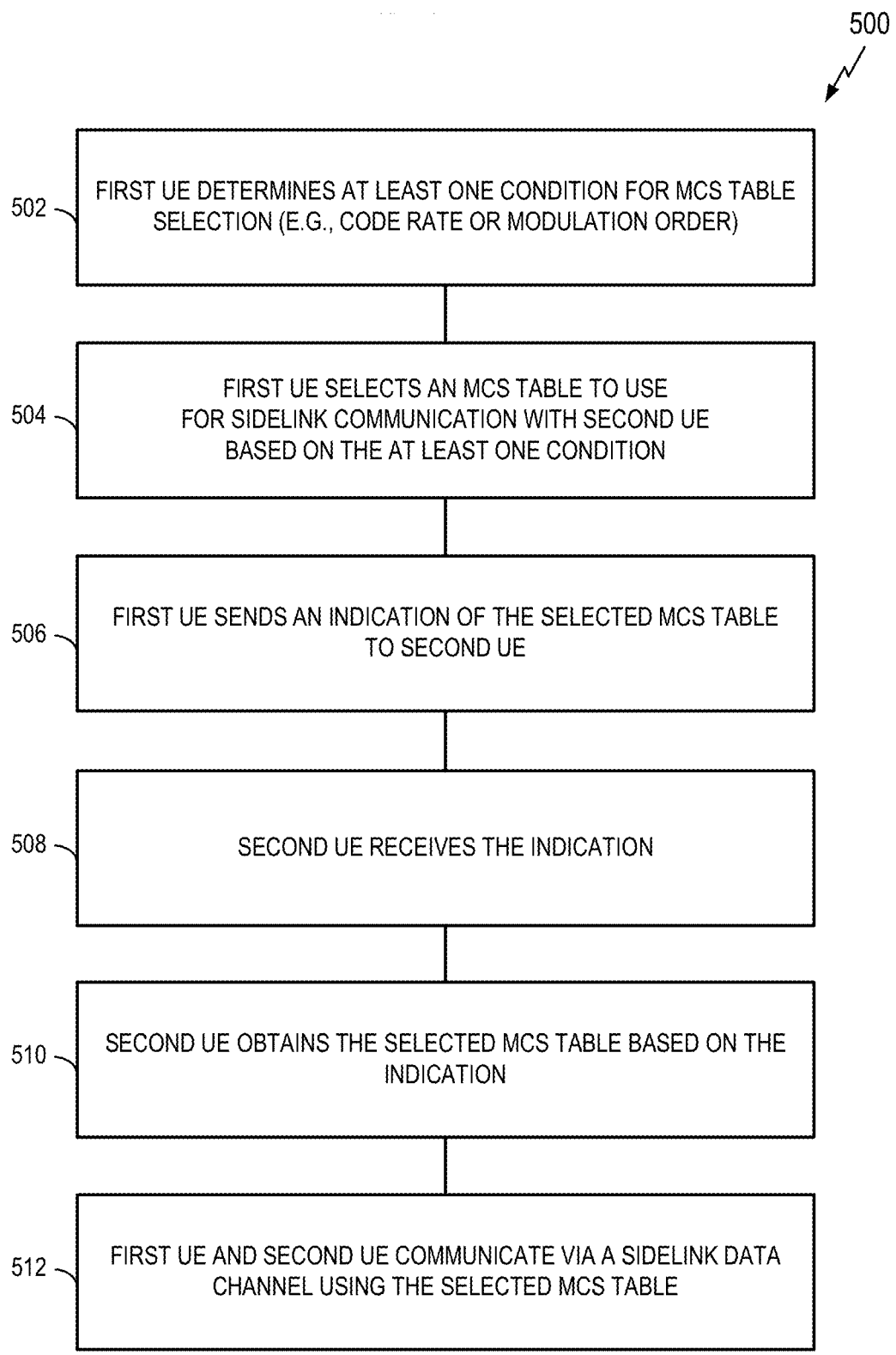
FIG. 5 is a flowchart illustrating an example communication process in accordance with some aspects of the disclosure.

FIG. 5 illustrates a process 500 for selecting an MCS table in accordance with some aspects of the disclosure. The process 500 may take place within a UE, an access terminal, a TRP, a base station, or some other suitable apparatus. Of course, in various aspects within the scope of the disclosure, the process 500 may be implemented by any suitable apparatus capable of supporting communication-related operations (e.g., sidelink operations).

At block 502, a first UE determines at least one condition for MCS table selection (e.g., code rate or modulation order).

At block 504, the first UE selects an MCS table to use for sidelink communication with a second UE based on the at least one condition (e.g., as discussed herein).

At block 506, the first UE sends an indication of the selected MCS table to the second UE.

At block 508, the second UE receives the indication.

At block 510, the second UE obtains the selected MCS table based on the indication. For example, the second UE may retrieve the MCS table from a set of MCS tables maintained by the second UE.

At block 512, the first UE and the second UE communicate via a sidelink data channel using the selected MCS table.

Figure 6:
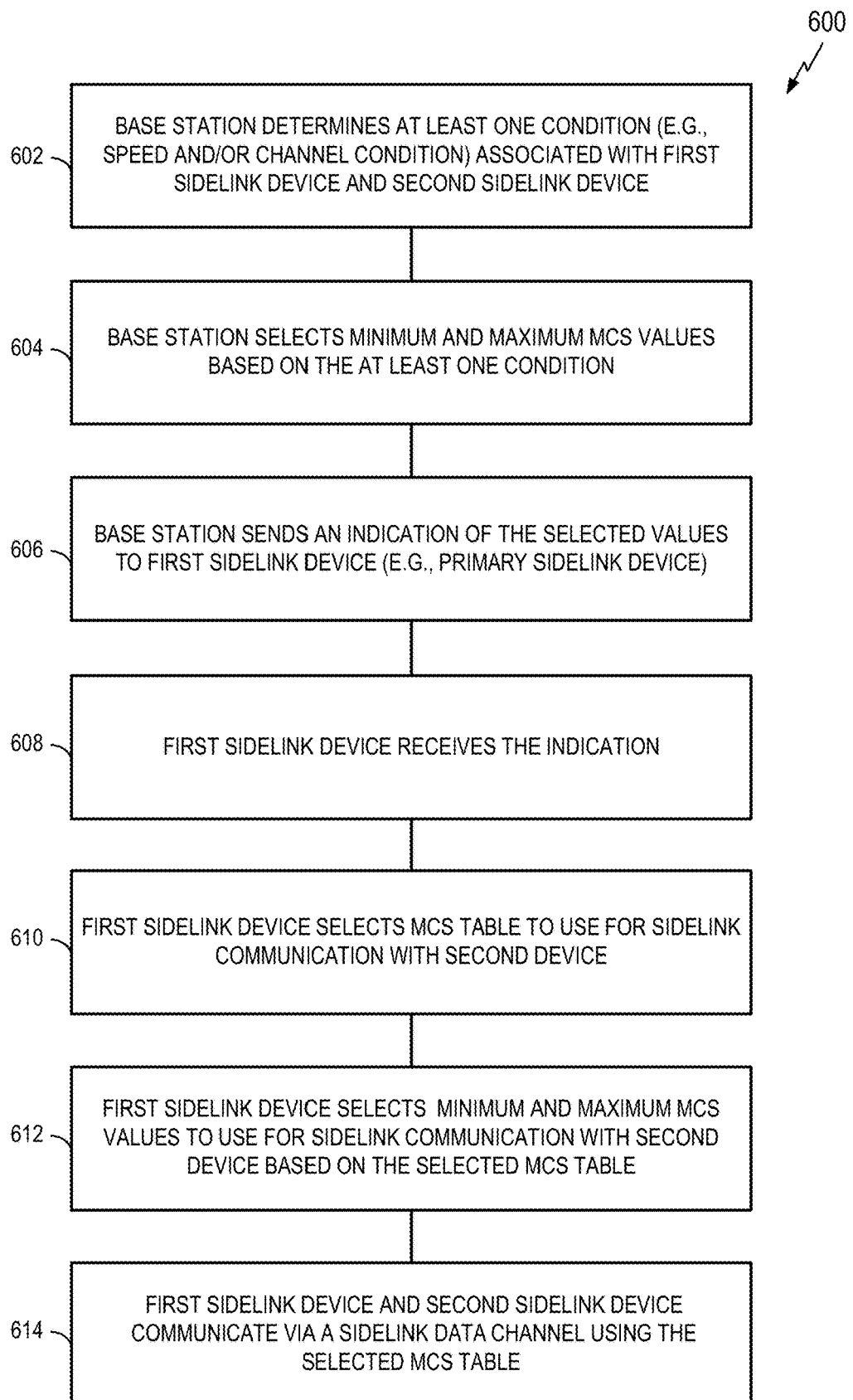
FIG. 6 is a flowchart illustrating another example communication process in accordance with some aspects of the disclosure.

FIG. 6 illustrates a process 600 for selecting an MCS table in accordance with some aspects of the disclosure. The process 600 may take place within a UE, an access terminal, a TRP, a base station, or some other suitable apparatus. Of course, in various aspects within the scope of the disclosure, the process 600 may be implemented by any suitable apparatus capable of supporting communication-related operations (e.g., sidelink operations).

At block 602, a base station (e.g., an eNB or a gNB) determines at least one condition (e.g., a translational speed and/or a channel condition) associated with a first sidelink device and a second sidelink device.

At block 604, the base station selects minimum and maximum MCS values (e.g., a set of minimum MCS values and a set of maximum MCS values) based on the at least one condition.

At block 606, the base station sends an indication of the selected values to the first sidelink device (e.g., a primary sidelink device).

At block 608, the first sidelink device receives the indication.

At block 610, the first sidelink device selects an MCS table to use for sidelink communication with the second device. The operations of block 610 may correspond to, for example, the operations of block 504 of FIG. 5.

At block 612, the first sidelink device selects minimum and maximum MCS values to use for sidelink communication with the second device based on the selected MCS table.

At block 614, the first sidelink device and the second sidelink device communicate via a sidelink data channel using the selected MCS table.

First Example Apparatus

Figure 7:
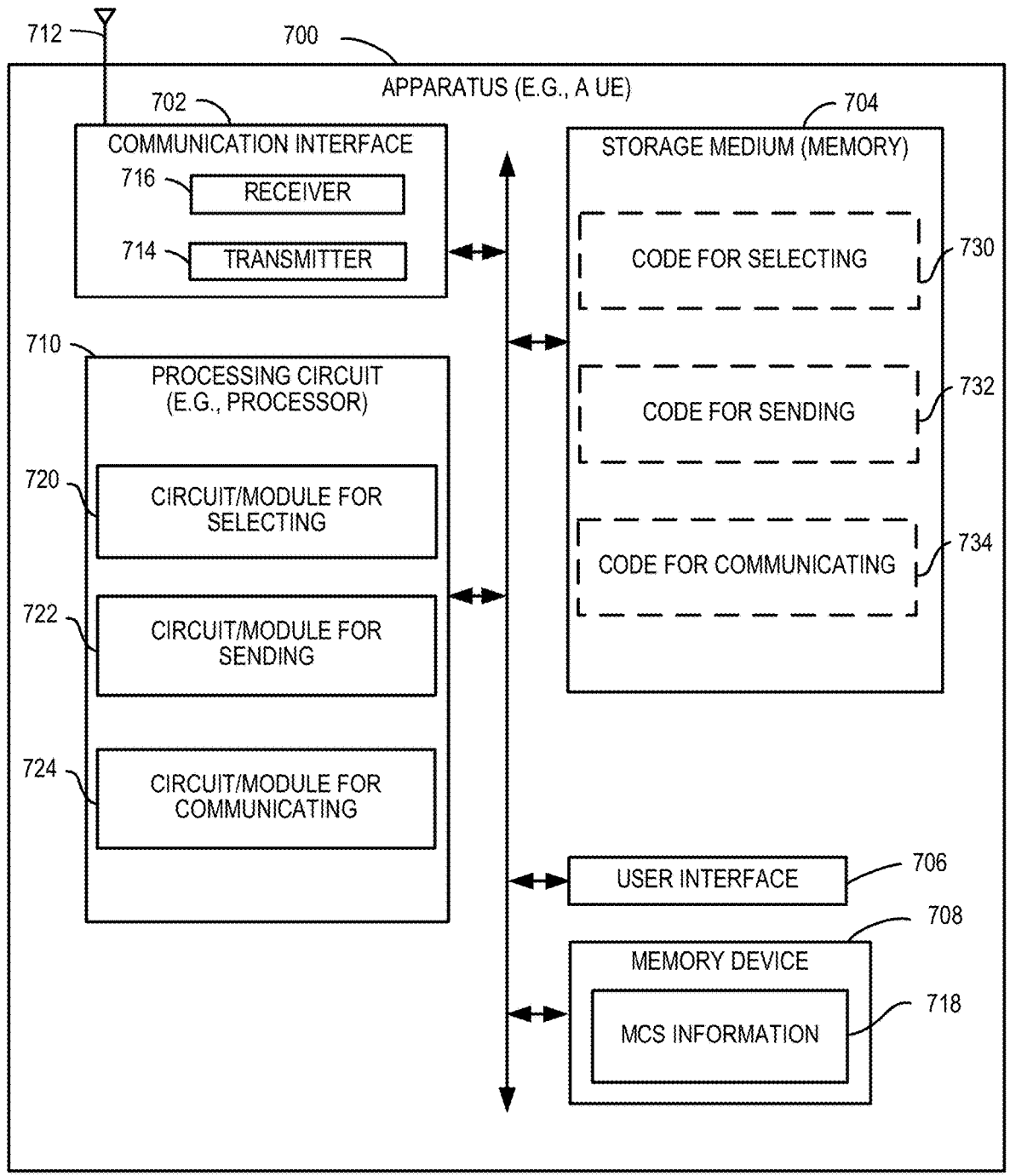
FIG. 7 is a block diagram illustrating an example hardware implementation for an apparatus (e.g., an electronic device) that can support communication in accordance with some aspects of the disclosure.

FIG. 7 illustrates a block diagram of an example hardware implementation of an apparatus 700 configured to communicate (e.g., using MCS tables) according to one or more aspects of the disclosure. The apparatus 700 could embody or be implemented within a UE, a transmit receive point (TRP), an access point, or some other type of device that supports communication as taught herein. In various implementations, the apparatus 700 could embody or be implemented within an access terminal, a base station, or some other type of device. In various implementations, the apparatus 700 could embody or be implemented within a mobile phone, a smart phone, a tablet, a portable computer, a server, a network entity, a personal computer, a sensor, an alarm, a vehicle, a machine, an entertainment device, a medical device, or any other electronic device having circuitry.

The apparatus 700 includes a communication interface 702 (e.g., at least one transceiver), a storage medium 704, a user interface 706, a memory device 708, and a processing circuit 710 (e.g., at least one processor). These components can be coupled to and/or placed in electrical communication with one another via a signaling bus or other suitable component, represented generally by the connection lines in FIG. 7. The signaling bus may include any number of interconnecting buses and bridges depending on the specific application of the processing circuit 710 and the overall design constraints. The signaling bus links together various circuits such that each of the communication interface 702, the storage medium 704, the user interface 706, and the memory device 708 are coupled to and/or in electrical communication with the processing circuit 710. The signaling bus may also link various other circuits (not shown) such as timing sources, peripherals, voltage regulators, and power management circuits, which are well known in the art, and therefore, will not be described any further.

The communication interface 702 may be adapted to facilitate wireless communication of the apparatus 700. For example, the communication interface 702 may include circuitry and/or programming adapted to facilitate the communication of information bi-directionally with respect to one or more communication devices in a network. Thus, in some implementations, the communication interface 702 may be coupled to one or more antennas 712 for wireless communication within a wireless communication system. In some implementations, the communication interface 702 may be configured for wire-based communication. For example, the communication interface 702 could be a bus interface, a send/receive interface, or some other type of signal interface including drivers, buffers, or other circuitry for outputting and/or obtaining signals (e.g., outputting signal from and/or receiving signals into an integrated circuit). The communication interface 702 can be configured with one or more standalone receivers and/or transmitters, as well as one or more transceivers. In the illustrated example, the communication interface 702 includes a transmitter 714 and a receiver 716.

The memory device 708 may represent one or more memory devices. As indicated, the memory device 708 may maintain MCS information 718 along with other information used by the apparatus 700. In some implementations, the memory device 708 and the storage medium 704 are implemented as a common memory component. The memory device 708 may also be used for storing data that is manipulated by the processing circuit 710 or some other component of the apparatus 700.

The storage medium 704 may represent one or more computer-readable, machine-readable, and/or processor-readable devices for storing programming, such as processor executable code or instructions (e.g., software, firmware), electronic data, databases, or other digital information. The storage medium 704 may also be used for storing data that is manipulated by the processing circuit 710 when executing programming. The storage medium 704 may be any available media that can be accessed by a general purpose or special purpose processor, including portable or fixed storage devices, optical storage devices, and various other mediums capable of storing, containing or carrying programming.

By way of example and not limitation, the storage medium 704 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 704 may be embodied in an article of manufacture (e.g., a computer program product). By way of example, a computer program product may include a computer-readable medium in packaging materials. In view of the above, in some implementations, the storage medium 704 may be a non-transitory (e.g., tangible) storage medium.

The storage medium 704 may be coupled to the processing circuit 710 such that the processing circuit 710 can read information from, and write information to, the storage medium 704. That is, the storage medium 704 can be coupled to the processing circuit 710 so that the storage medium 704 is at least accessible by the processing circuit 710, including examples where at least one storage medium is integral to the processing circuit 710 and/or examples where at least one storage medium is separate from the processing circuit 710 (e.g., resident in the apparatus 700, external to the apparatus 700, distributed across multiple entities, etc.).

Programming stored by the storage medium 704, when executed by the processing circuit 710, causes the processing circuit 710 to perform one or more of the various functions and/or process operations described herein. For example, the storage medium 704 may include operations configured for regulating operations at one or more hardware blocks of the processing circuit 710, as well as to utilize the communication interface 702 for wireless communication utilizing their respective communication protocols. In some aspects, the storage medium 704 may include a non-transitory computer-readable medium storing computer-executable code, including code to perform the functionality described herein.

The processing circuit 710 is generally adapted for processing, including the execution of such programming stored on the storage medium 704. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 710 is arranged to obtain, process and/or send data, control data access and storage, issue commands, and control other desired operations. The processing circuit 710 may include circuitry configured to implement desired programming provided by appropriate media in at least one example. For example, the processing circuit 710 may be implemented as one or more processors, one or more controllers, and/or other structure configured to execute executable programming Examples of the processing circuit 710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 710 are for illustration and other suitable configurations within the scope of the disclosure are also contemplated.

According to one or more aspects of the disclosure, the processing circuit 710 may be adapted to perform any or all of the features, processes, functions, operations and/or routines for any or all of the apparatuses described herein. For example, the processing circuit 710 may be configured to perform any of the steps, functions, and/or processes described with respect to FIGS. 1-6 and 8. As used herein, the term "adapted" in relation to the processing circuit 710 may refer to the processing circuit 710 being one or more of configured, used, implemented, and/or programmed to perform a particular process, function, operation and/or routine according to various features described herein.

The processing circuit 710 may be a specialized processor, such as an application specific integrated circuit (ASIC) that serves as a means for (e.g., structure for) carrying out any one of the operations described in conjunction with FIGS. 1-6 and 8. The processing circuit 710 may serve as one example of a means for transmitting and/or a means for receiving. In various implementations, the processing circuit 710 may provide and/or incorporate, at least in part, the functionality described above for the first device 204 (e.g., the module for management of MCS table and MCS limits 230) of FIG. 2.

According to at least one example of the apparatus 700, the processing circuit 710 may include one or more of a circuit/module for selecting 720, a circuit/module for sending 722, or a circuit/module for communicating 724. In various implementations, the circuit/module for selecting 720, the circuit/module for sending 722, or the circuit/module for communicating 724 may provide and/or incorporate, at least in part, the functionality described above for the first device 204 (e.g., the module for management of MCS table and MCS limits 230) of FIG. 2.

As mentioned above, programming stored by the storage medium 704, when executed by the processing circuit 710, causes the processing circuit 710 to perform one or more of the various functions and/or process operations described herein. For example, the programming may cause the processing circuit 710 to perform the various functions, steps, and/or processes described herein with respect to FIGS. 1-6 and 8 in various implementations. As shown in FIG. 7, the storage medium 704 may include one or more of code for selecting 730, code for sending 732, or code for communicating 734. In various implementations, the code for selecting 730, the code for sending 732, or the code for communicating 734 may be executed or otherwise used to provide the functionality described herein for the circuit/module for selecting 720, the circuit/module for sending 722, or the circuit/module for communicating 724.

The circuit/module for selecting 720 may include circuitry and/or programming (e.g., code for selecting 730 stored on the storage medium 704) adapted to perform several functions relating to, for example, making a selection. In some aspects, the circuit/module for selecting 720 (e.g., a means for selecting) may correspond to, for example, a processing circuit.

The circuit/module for selecting 720 may make a selection based on one or more inputs. For example, the circuit/module for selecting 720 may select a set of MCS values from a plurality of sets of MCS values based on one or more of: a code rate, a modulation order, or some other factor. Thus, the circuit/module for selecting 720 may initially obtain input information (e.g., from the memory device 708, or some other component of the apparatus 700). The circuit/module for circuit/module for selecting 720 can thus make the selection based on the appropriate input (e.g., as discussed herein in conjunction with FIGS. 1-6). The circuit/module for selecting 720 may then output an indication of the selection (e.g., to the circuit/module for sending 722, the circuit/module for communicating 724, the communication interface 702, the memory device 708, or some other component of the apparatus 700).

The circuit/module for sending 722 may include circuitry and/or programming (e.g., code for sending 732 stored on the storage medium 704) adapted to perform several functions relating to, for example, sending (e.g., transmitting) information. In some implementations, the circuit/module for sending 722 may obtain information (e.g., from the memory device 708, or some other component of the apparatus 700) and process the information (e.g., encode the information for transmission). For example, the circuit/module for sending 722 may obtain an indication of a selected set of MCS values from the circuit/module for selecting 720. In some scenarios, the circuit/module for sending 722 sends the information to another component (e.g., the transmitter 714, the communication interface 702, or some other component) that will transmit the information to another device. In some scenarios (e.g., if the circuit/module for sending 722 includes a transmitter), the circuit/module for sending 722 transmits the information directly to another device (e.g., the ultimate destination) via radio frequency signaling or some other type of signaling suitable for the applicable communication medium.

The circuit/module for sending 722 (e.g., a means for sending) may take various forms. In some aspects, the circuit/module for sending 722 may correspond to, for example, an interface (e.g., a bus interface, a send/receive interface, or some other type of signal interface), a communication device, a transceiver, a transmitter, or some other similar component as discussed herein. In some implementations, the communication interface 702 includes the circuit/module for sending 722 and/or the code for sending 732. In some implementations, the circuit/module for sending 722 and/or the code for sending 732 is configured to control the communication interface 702 (e.g., a transceiver or a transmitter) to send information. In some implementations, the circuit/module for sending 722 is part of the circuit/module for communicating 724

The circuit/module for communicating 724 may include circuitry and/or programming (e.g., code for communicating 734 stored on the storage medium 704) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 724 may communicate data using a selected set of MCS values (e.g., obtained from the circuit/module for selecting 720). In some aspects, the circuit/module for communicating 724 may communicate via an NR sidelink.

In some implementations where the communicating involves receiving information, the circuit/module for communicating 724 receives information (e.g., from the communication interface 702, the receiver 716, the memory device 708, some other component of the apparatus 700, or some other device), processes (e.g., decodes) the information, and outputs the information to another component of the apparatus 700 (e.g., the memory device 708 or some other component). In some scenarios (e.g., if the circuit/module for communicating 724 includes a receiver), the communicating involves the circuit/module for communicating 724 receiving information directly from a device that transmitted the information (e.g., via radio frequency signaling or some other type of signaling suitable for the applicable communication medium).

In some implementations where the communicating involves sending information, the circuit/module for communicating 724 obtains information (e.g., from the memory device 708 or some other component of the apparatus 700), processes (e.g., encodes) the information, and outputs the processed information. In some scenarios, the communicating involves sending the information to another component of the apparatus 700 (e.g., the transmitter 714, the communication interface 702, or some other component) that will transmit the information to another device. In some scenarios (e.g., if the circuit/module for communicating 724 includes a transmitter), the communicating involves the circuit/module for communicating 724 transmitting the information directly to another device (e.g., the ultimate destination) via radio frequency signaling or some other type of signaling suitable for the applicable communication medium.

The circuit/module for communicating 724 (e.g., a means for communicating) may take various forms. In some aspects, the circuit/module for communicating 724 may correspond to, for example, an interface (e.g., a bus interface, a send/receive interface, or some other type of signal interface), a communication device, a transceiver, a transmitter, a receiver, or some other similar component as discussed herein. In some implementations, the communication interface 702 includes the circuit/module for communicating 724 and/or the code for communicating 734. In some implementations, the circuit/module for communicating 724 and/or the code for communicating 734 is configured to control the communication interface 702 (e.g., a transceiver, a receiver, or a transmitter) to communicate the information.

First Example Process

Figure 8:
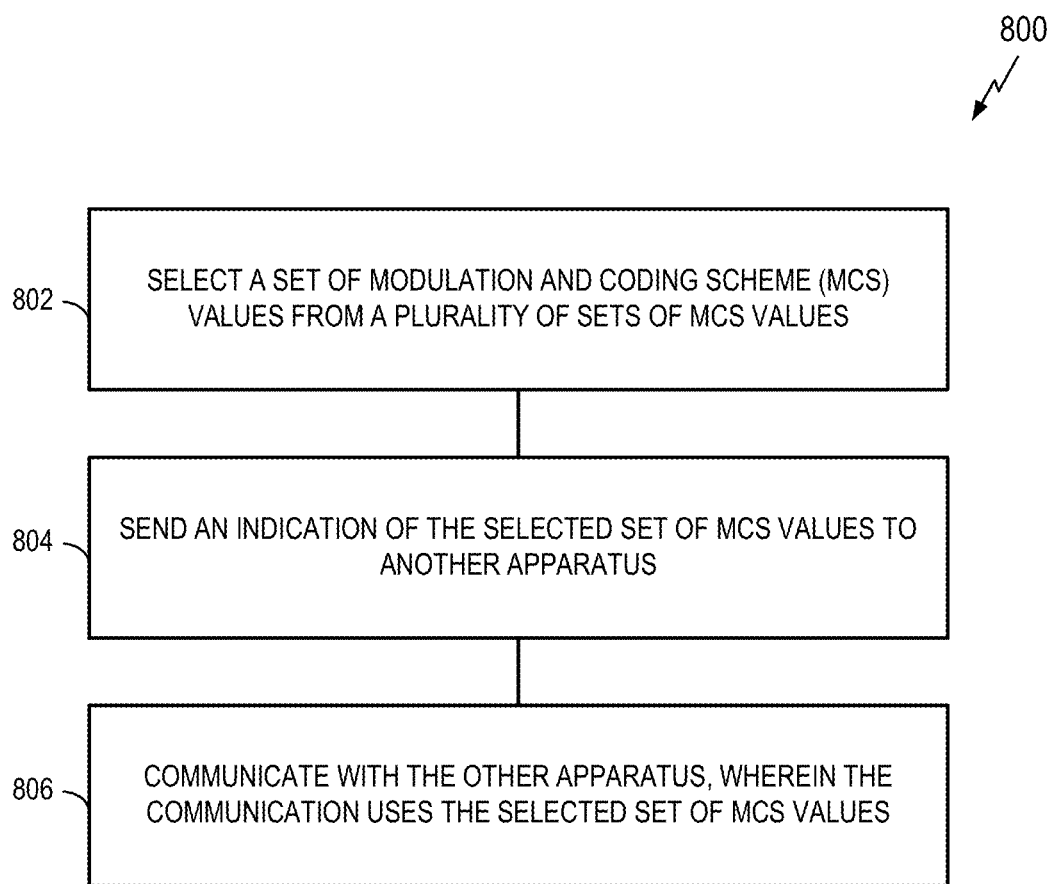
FIG. 8 is a flowchart illustrating an example of a process for signaling a selected MCS set in accordance with some aspects of the disclosure.

FIG. 8 illustrates a process 800 for communication in accordance with some aspects of the disclosure. The process 800 may take place within a processing circuit (e.g., the processing circuit 710 of FIG. 7), which may be located in a UE, an access terminal, a TRP, a base station, or some other suitable apparatus. Of course, in various aspects within the scope of the disclosure, the process 800 may be implemented by any suitable apparatus capable of supporting communication-related operations (e.g., sidelink operations).

At block 802, an apparatus (e.g., a UE) selects a set of modulation and coding scheme (MCS) values from a plurality of sets of MCS values.

The sets of MCS values may take different forms in different implementations. In some aspects, the plurality of sets of MCS values may include a first MCS table and a second MCS table. In some aspects, the first MCS table may support up to a first modulation order; and the second MCS table may support up to a second modulation order that is different from the first modulation order. In some aspects, the first MCS table may support up to 16 quadrature amplitude modulation (QAM); and the second MCS table may support up to 64 QAM. In some aspects, modulation order entries of the first MCS table for MCS index values of 18, 19, and 20 may have a value of 4; and modulation order entries of the second MCS table for MCS index values of 18, 19, and 20 may have a value of 6.

The selection of the set of MCS values may take different forms in different implementations. In some aspects, the selection of the set of MCS values may include: determining a modulation order to be used for the communication; and selecting the set of MCS values based on the determined modulation order. In some aspects, the selection of the set of MCS values may include: determining whether 16 quadrature amplitude modulation (QAM) or 64 QAM is to be used for the communication; and selecting the set of MCS values based on the determination.

In some aspects, the selection of the set of MCS values may be based on a code rate for the communication. In some aspects, the selection of the set of MCS values may be based on whether a code rate for the communication is greater than or equal to a threshold code rate for a particular modulation order. In some aspects, the selection of the set of MCS values may be based on whether a code rate for the communication is greater than 0.931 for 16 quadrature amplitude modulation (QAM). In some aspects, the selection of the set of MCS values may include determining that a code rate for the communication is greater than 0.931 for 16 quadrature amplitude modulation (QAM); and selecting a 64 QAM MCS table as a result of the determination.

At block 804, the apparatus sends an indication of the selected set of MCS values to another apparatus. In some aspects, the indication may be sent via a peer-to-peer control channel, a sidelink control channel, a vehicle-to-anything control channel, or any combination thereof.

At block 806, the apparatus communicates with the other apparatus, where the communication uses the selected set of MCS values. In some aspects, the communication may be via a peer-to-peer data channel, a sidelink data channel, a vehicle-to-anything data channel, or any combination thereof.

In some aspects, a process in accordance with the teachings herein may include any combination of the above operations and/or features.

Second Example Apparatus

Figure 9:
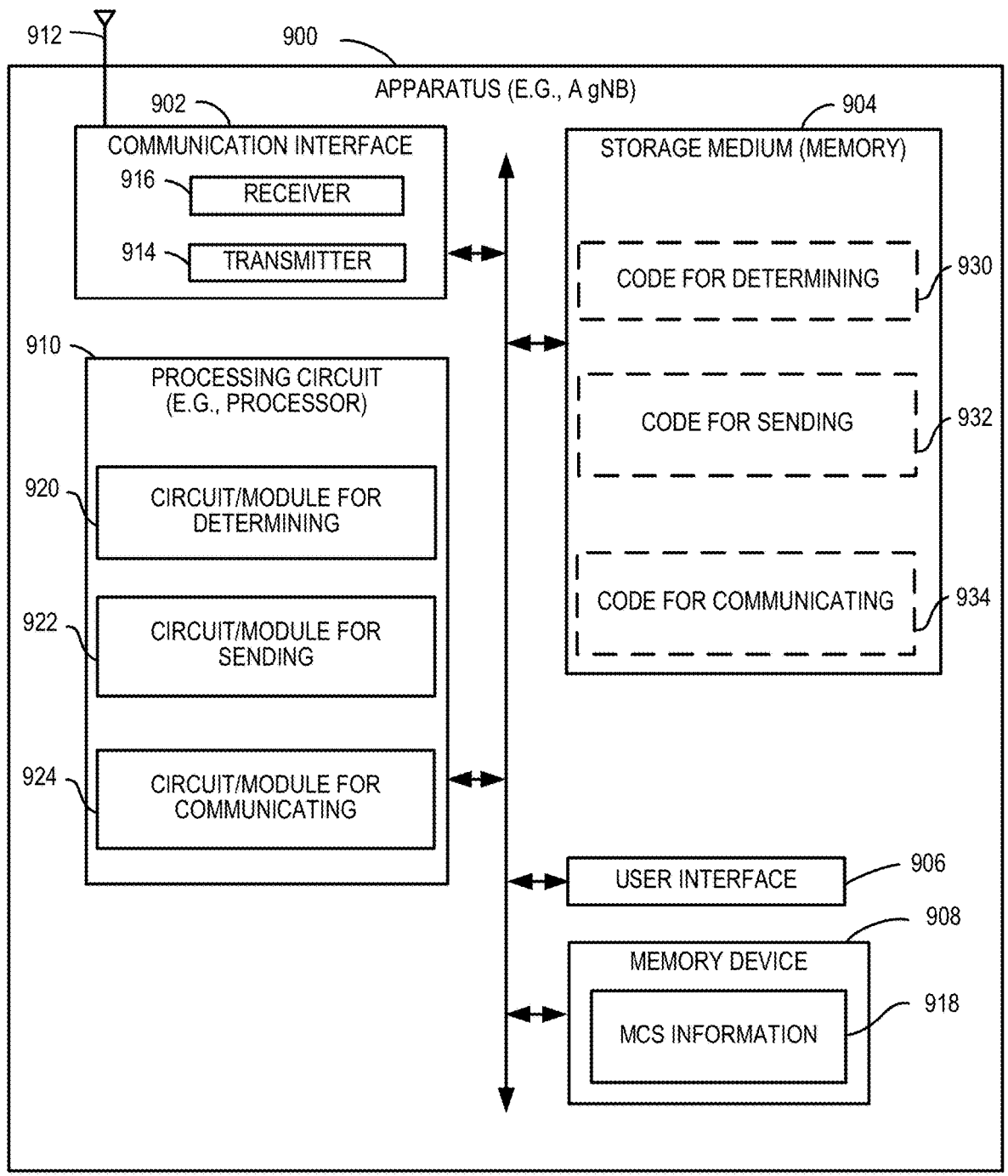
FIG. 9 is a block diagram illustrating another example hardware implementation for an apparatus (e.g., an electronic device) that can support communication in accordance with some aspects of the disclosure.

FIG. 9 illustrates a block diagram of an example hardware implementation of an apparatus 900 configured to communicate (e.g., using MCS tables) according to one or more aspects of the disclosure. The apparatus 900 could embody or be implemented within a gNB, a transmit receive point (TRP), an access point, a UE, or some other type of device that supports wireless communication as taught herein. In various implementations, the apparatus 900 could embody or be implemented within a base station, an access terminal, or some other type of device. In various implementations, the apparatus 900 could embody or be implemented within a server, a network entity, a mobile phone, a smart phone, a tablet, a portable computer, a personal computer, a sensor, an alarm, a vehicle, a machine, an entertainment device, a medical device, or any other electronic device having circuitry.

The apparatus 900 includes a communication interface 902 (e.g., at least one transceiver), a storage medium 904, a user interface 906, a memory device 908 (e.g., storing MCS information 918), and a processing circuit 910 (e.g., at least one processor). In various implementations, the user interface 906 may include one or more of: a keypad, a display, a speaker, a microphone, a touchscreen display, of some other circuitry for receiving an input from or sending an output to a user. The communication interface 902 may be coupled to one or more antennas 912, and may include a transmitter 914 and a receiver 916. In general, the components of FIG. 9 may be similar to corresponding components of the apparatus 700 of FIG. 7.

According to one or more aspects of the disclosure, the processing circuit 910 may be adapted to perform any or all of the features, processes, functions, operations and/or routines for any or all of the apparatuses described herein. For example, the processing circuit 910 may be configured to perform any of the steps, functions, and/or processes described with respect to FIGS. 1-6 and 10. As used herein, the term "adapted" in relation to the processing circuit 910 may refer to the processing circuit 910 being one or more of configured, used, implemented, and/or programmed to perform a particular process, function, operation and/or routine according to various features described herein.

The processing circuit 910 may be a specialized processor, such as an application specific integrated circuit (ASIC) that serves as a means for (e.g., structure for) carrying out any one of the operations described in conjunction with FIGS. 1-6 and 10. The processing circuit 910 may serve as one example of a means for transmitting and/or a means for receiving. In various implementations, the processing circuit 910 may provide and/or incorporate, at least in part, the functionality described above for the TRP 202 (e.g., the module for management of MCS table and MCS limits 224) of FIG. 2.

According to at least one example of the apparatus 900, the processing circuit 910 may include one or more of a circuit/module for determining 920, a circuit/module for sending 922, or a circuit/module for communicating 924. In various implementations, the circuit/module for determining 920, the circuit/module for sending 922, or the circuit/module for communicating 924 may provide and/or incorporate, at least in part, the functionality described above for the TRP 202 (e.g., the module for management of MCS table and MCS limits 224) of FIG. 2.

As mentioned above, programming stored by the storage medium 904, when executed by the processing circuit 910, causes the processing circuit 910 to perform one or more of the various functions and/or process operations described herein. For example, the programming may cause the processing circuit 910 to perform the various functions, steps, and/or processes described herein with respect to FIGS. 1-6 and 10 in various implementations. As shown in FIG. 9, the storage medium 904 may include one or more of code for determining 930, code for sending 932, or code for communicating 934. In various implementations, the code for determining 930, the code for sending 932, or the code for communicating 934 may be executed or otherwise used to provide the functionality described herein for the circuit/module for determining 920, the circuit/module for sending 922, or the circuit/module for communicating 924.

The circuit/module for determining 920 may include circuitry and/or programming (e.g., code for determining 930 stored on the storage medium 904) adapted to perform several functions relating to, for example, making a determination. In some aspects, the circuit/module for determining 920 (e.g., a means for determining) may correspond to, for example, a processing circuit.

The circuit/module for determining 920 may make a selection based on one or more inputs. For example, the circuit/module for determining 920 may determine minimum and maximum values for sets of MCS values defined for peer-to-peer communication between devices. In some aspects, this determination may be based on one or more conditions associated with one or more of the devices (e.g., speed, channel conditions, etc.). Thus, the circuit/module for determining 920 may initially obtain input information (e.g., from the memory device 908, the communication interface 902, or some other component of the apparatus 900). The circuit/module for circuit/module for determining 920 can thus make one or more determinations based on the appropriate input (e.g., as discussed herein in conjunction with FIGS. 1-6). The circuit/module for determining 920 may then output an indication of the determination (e.g., minimum values and maximum values) to the circuit/module for sending 922, the circuit/module for communicating 924, the communication interface 902, the memory device 908, or some other component of the apparatus 900.

The circuit/module for sending 922 may include circuitry and/or programming (e.g., code for sending 932 stored on the storage medium 904) adapted to perform several functions relating to, for example, sending (e.g., transmitting) information. In some implementations, the circuit/module for sending 922 may obtain information (e.g., from the memory device 908, or some other component of the apparatus 900) and process the information (e.g., encode the information for transmission). For example, the circuit/module for sending 922 may obtain minimum values and maximum values from the circuit/module for determining 920. In some scenarios, the circuit/module for sending 922 sends the information to another component (e.g., the transmitter 914, the communication interface 902, or some other component) that will transmit the information to another device. In some scenarios (e.g., if the circuit/module for sending 922 includes a transmitter), the circuit/module for sending 922 transmits the information directly to another device (e.g., the ultimate destination) via radio frequency signaling or some other type of signaling suitable for the applicable communication medium.

The circuit/module for sending 922 (e.g., a means for sending) may take various forms. In some aspects, the circuit/module for sending 922 may correspond to, for example, an interface (e.g., a bus interface, a send/receive interface, or some other type of signal interface), a communication device, a transceiver, a transmitter, or some other similar component as discussed herein. In some implementations, the communication interface 902 includes the circuit/module for sending 922 and/or the code for sending 932. In some implementations, the circuit/module for sending 922 and/or the code for sending 932 is configured to control the communication interface 902 (e.g., a transceiver or a transmitter) to send information. In some implementations, the circuit/module for sending 922 is part of the circuit/module for communicating 924

The circuit/module for communicating 924 may include circuitry and/or programming (e.g., code for communicating 934 stored on the storage medium 904) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 924 may communicate data using a selected set of MCS values. In some aspects, the circuit/module for communicating 924 may communicate via an NR sidelink.

In some implementations where the communicating involves receiving information, the circuit/module for communicating 924 receives information (e.g., from the communication interface 902, the receiver 916, the memory device 908, some other component of the apparatus 900, or some other device), processes (e.g., decodes) the information, and outputs the information to another component of the apparatus 900 (e.g., the memory device 908 or some other component). In some scenarios (e.g., if the circuit/module for communicating 924 includes a receiver), the communicating involves the circuit/module for communicating 924 receiving information directly from a device that transmitted the information (e.g., via radio frequency signaling or some other type of signaling suitable for the applicable communication medium).

In some implementations where the communicating involves sending information, the circuit/module for communicating 924 obtains information (e.g., from the memory device 908 or some other component of the apparatus 900), processes (e.g., encodes) the information, and outputs the processed information. In some scenarios, the communicating involves sending the information to another component of the apparatus 900 (e.g., the transmitter 914, the communication interface 902, or some other component) that will transmit the information to another device. In some scenarios (e.g., if the circuit/module for communicating 924 includes a transmitter), the communicating involves the circuit/module for communicating 924 transmitting the information directly to another device (e.g., the ultimate destination) via radio frequency signaling or some other type of signaling suitable for the applicable communication medium.

The circuit/module for communicating 924 (e.g., a means for communicating) may take various forms. In some aspects, the circuit/module for communicating 924 may correspond to, for example, an interface (e.g., a bus interface, a send/receive interface, or some other type of signal interface), a communication device, a transceiver, a transmitter, a receiver, or some other similar component as discussed herein. In some implementations, the communication interface 902 includes the circuit/module for communicating 924 and/or the code for communicating 934. In some implementations, the circuit/module for communicating 924 and/or the code for communicating 934 is configured to control the communication interface 902 (e.g., a transceiver, a receiver, or a transmitter) to communicate the information.

Second Example Process

Figure 10:
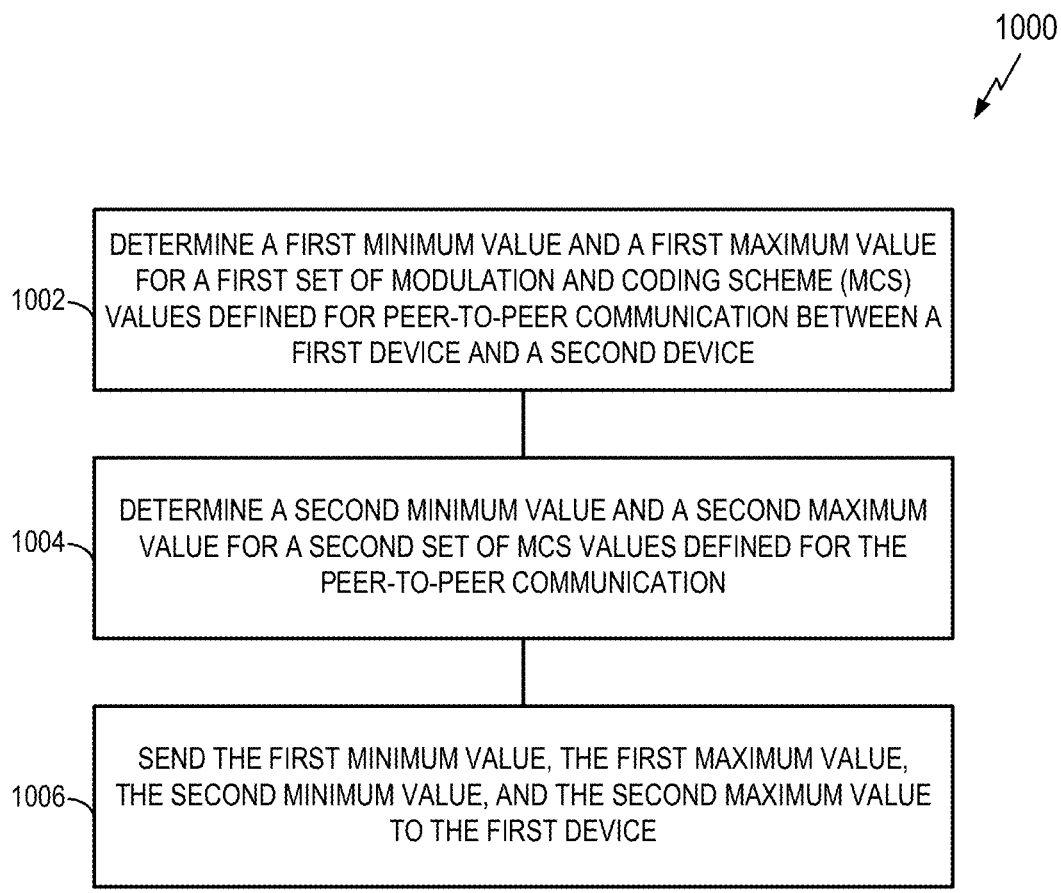
FIG. 10 is a flowchart illustrating an example of a process for signaling selected minimum and maximum values in accordance with some aspects of the disclosure.

FIG. 10 illustrates a process 1000 for communication in accordance with some aspects of the disclosure. The process 1000 may take place within a processing circuit (e.g., the processing circuit 910 of FIG. 9), which may be located in a gNB, a TRP, a base station, a UE, an access terminal, or some other suitable apparatus. Of course, in various aspects within the scope of the disclosure, the process 1000 may be implemented by any suitable apparatus capable of supporting communication-related operations.

At block 1002, an apparatus (e.g., a gNB) determines a first minimum value and a first maximum value for a first set of modulation and coding scheme (MCS) values defined for peer-to-peer communication (e.g., D2D communication such as sidelink communication) between a first device and a second device.

At block 1004, the apparatus determines a second minimum value and a second maximum value for a second set of MCS values defined for the peer-to-peer communication.

At block 1006, the apparatus sends the first minimum value, the first maximum value, the second minimum value, and the second maximum value to the first device (e.g., a UE).

In some aspects, the process 1000 may further include determining at least one other minimum value and at least one other maximum value for at least one other set of MCS values; and sending the at least one other minimum value and the at least one other maximum value to the first device.

The sets of MCS values may take different forms in different implementations. In some aspects, the first set of MCS values may include a first MCS table; and the second set of MCS values may include a second MCS table. In some aspects, the first MCS table may support up to a first modulation order; and the second MCS table may support up to a second modulation order that is different from the first modulation order. In some aspects, the first MCS table may support up to 16 quadrature amplitude modulation (QAM); and the second MCS table may support up to 64 QAM.

The determination of the values may take different forms in different implementations. In some aspects, the determination of the first minimum value, the first maximum value, the second minimum value, and the second maximum value may include: determining a condition of a channel to be used for the peer-to-peer communication; and selecting the first minimum value, the first maximum value, the second minimum value, and the second maximum value based on the determined condition of the channel. In some aspects, the channel may be a peer-to-peer data channel, a sidelink data channel, a vehicle-to-anything data channel, or any combination thereof. In some aspects, the determination of the first minimum value, the first maximum value, the second minimum value, and the second maximum value may be based on a condition associated with at least one of the first device or the second device. In some aspects, the condition may include at least one rate of motion of at least one of the first device or the second device.

In some aspects, a process in accordance with the teachings herein may include any combination of the above operations and/or features.

Third Example Apparatus

Figure 11:
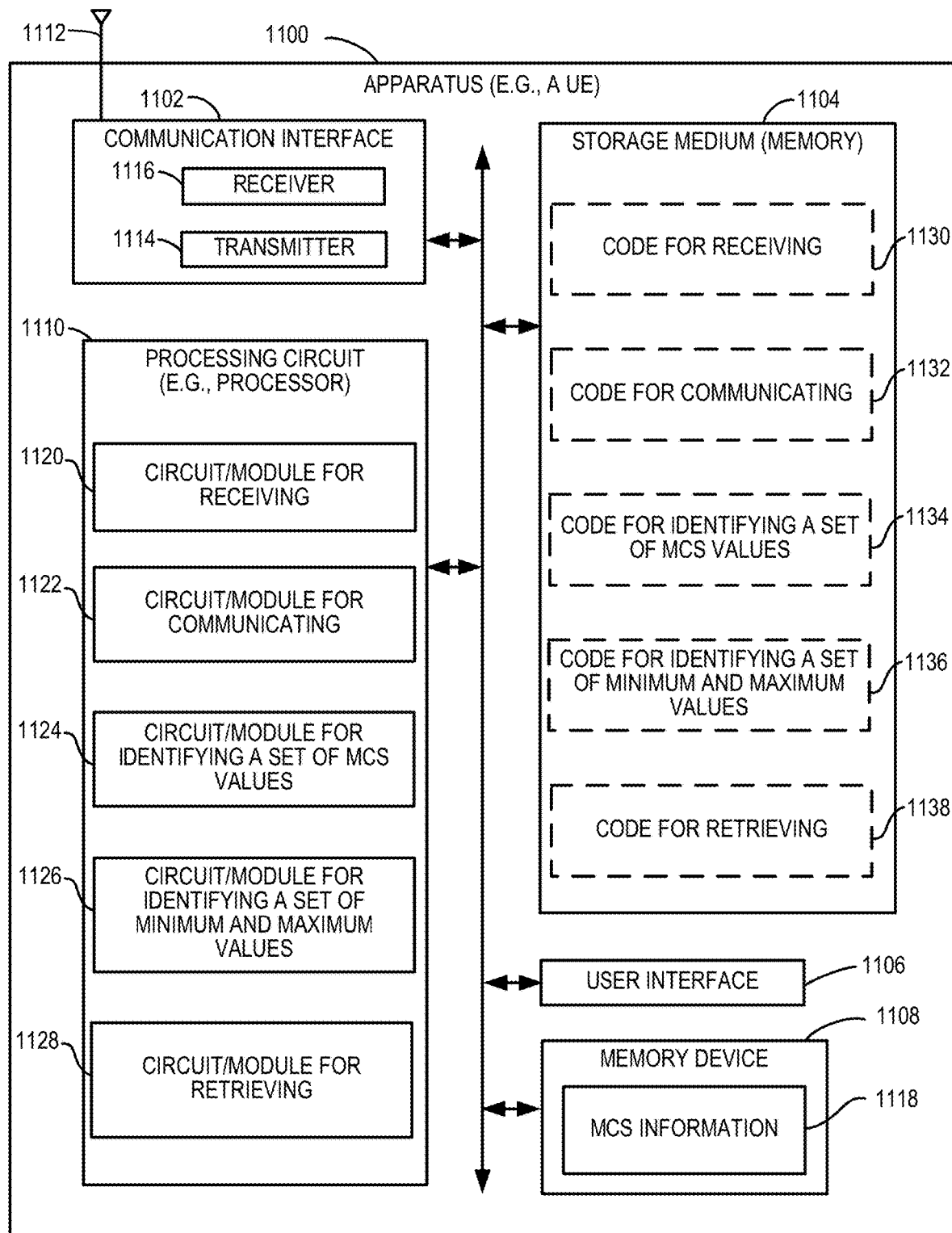
FIG. 11 is a block diagram illustrating another example hardware implementation for an apparatus (e.g., an electronic device) that can support communication in accordance with some aspects of the disclosure.

FIG. 11 illustrates a block diagram of an example hardware implementation of an apparatus 1100 configured to communicate (e.g., using MCS tables) according to one or more aspects of the disclosure. The apparatus 1100 could embody or be implemented within a UE, a gNB, a transmit receive point (TRP), an access point, or some other type of device that supports wireless communication (e.g., with adaptive frame characteristics) as taught herein. In various implementations, the apparatus 1100 could embody or be implemented within a base station, an access terminal, or some other type of device. In various implementations, the apparatus 1100 could embody or be implemented within a mobile phone, a smart phone, a tablet, a portable computer, a personal computer, a sensor, an alarm, a vehicle, a machine, a server, a network entity, an entertainment device, a medical device, or any other electronic device having circuitry.

The apparatus 1100 includes a communication interface 1102 (e.g., at least one transceiver), a storage medium 1104, a user interface 1106, a memory device 1108 (e.g., storing MCS information 1118), and a processing circuit 1110 (e.g., at least one processor). In various implementations, the user interface 1106 may include one or more of: a keypad, a display, a speaker, a microphone, a touchscreen display, of some other circuitry for receiving an input from or sending an output to a user. The communication interface 1102 may be coupled to one or more antennas 1112, and may include a transmitter 1114 and a receiver 1116. In general, the components of FIG. 11 may be similar to corresponding components of the apparatus 700 of FIG. 7.

According to one or more aspects of the disclosure, the processing circuit 1110 may be adapted to perform any or all of the features, processes, functions, operations and/or routines for any or all of the apparatuses described herein. For example, the processing circuit 1110 may be configured to perform any of the steps, functions, and/or processes described with respect to FIGS. 1-6, 12, and 13. As used herein, the term "adapted" in relation to the processing circuit 1110 may refer to the processing circuit 1110 being one or more of configured, used, implemented, and/or programmed to perform a particular process, function, operation and/or routine according to various features described herein.

The processing circuit 1110 may be a specialized processor, such as an application specific integrated circuit (ASIC) that serves as a means for (e.g., structure for) carrying out any one of the operations described in conjunction with FIGS. 1-6, 12, and 13. The processing circuit 1110 may serve as one example of a means for transmitting and/or a means for receiving. In various implementations, the processing circuit 1110 may provide and/or incorporate, at least in part, the functionality described above for the second device 206 (e.g., the module for management of MCS table and MCS limits 232) of FIG. 2.

According to at least one example of the apparatus 1100, the processing circuit 1110 may include one or more of a circuit/module for receiving 1120, a circuit/module for communicating 1122, a circuit/module for identifying a set of MCS values 1124, a circuit/module for identifying a set of minimum and maximum values 1126, or a circuit/module for retrieving 1128. In various implementations, the circuit/module for receiving 1120, the circuit/module for communicating 1122, the circuit/module for identifying a set of MCS values 1124, the circuit/module for identifying a set of minimum and maximum values 1126, or the circuit/module for retrieving 1128 may provide and/or incorporate, at least in part, the functionality described above for the second device 206 (e.g., the module for management of MCS table and MCS limits 232) of FIG. 2.

As mentioned above, programming stored by the storage medium 1104, when executed by the processing circuit 1110, causes the processing circuit 1110 to perform one or more of the various functions and/or process operations described herein. For example, the programming may cause the processing circuit 1110 to perform the various functions, steps, and/or processes described herein with respect to FIGS. 1-6, 12, and 13 in various implementations. As shown in FIG. 11, the storage medium 1104 may include one or more of code for receiving 1130, code for communicating 1132, code for identifying a set of MCS values 1134, code for identifying a set of minimum and maximum values 1136, or code for retrieving 1138. In various implementations, the code for receiving 1130, the code for communicating 1132, the code for identifying a set of MCS values 1134, the code for identifying a set of minimum and maximum values 1136, or the code for retrieving 1138 may be executed or otherwise used to provide the functionality described herein for the circuit/module for receiving 1120, the circuit/module for communicating 1122, the circuit/module for identifying a set of MCS values 1124, the circuit/module for identifying a set of minimum and maximum values 1126, or the circuit/module for retrieving 1128.

The circuit/module for receiving 1120 may include circuitry and/or programming (e.g., code for receiving 1130 stored on the storage medium 1104) adapted to perform several functions relating to, for example, receiving information (e.g., an indication of a selected set of MCS values, sets of MCS values, sets of minimum values and maximum values, or data). In some scenarios, the circuit/module for receiving 1120 may obtain information (e.g., from the communication interface 1102, the memory device, or some other component of the apparatus 1100) and process (e.g., decode) the information. In some scenarios (e.g., if the circuit/module for receiving 1120 is or includes an RF receiver), the circuit/module for receiving 1120 may receive information directly from a device that transmitted the information (e.g., via RF signaling). In either case, the circuit/module for receiving 1120 may output the obtained information to another component of the apparatus 1100 (e.g., the circuit/module for identifying a set of MCS values 1124, the circuit/module for identifying a set of minimum and maximum values 1126, the circuit/module for retrieving 1128, the memory device 1108, or some other component).

The circuit/module for receiving 1120 (e.g., a means for receiving) may take various forms. In some aspects, the circuit/module for receiving 1120 may correspond to, for example, an interface (e.g., a bus interface, a send/receive interface, or some other type of signal interface), a communication device, a transceiver, a receiver, or some other similar component as discussed herein. In some implementations, the communication interface 1102 includes the circuit/module for receiving 1120 and/or the code for receiving 1130. In some implementations, the circuit/module for receiving 1120 and/or the code for receiving 1130 is configured to control the communication interface 1102 (e.g., a transceiver or a receiver) to receive information.

The circuit/module for communicating 1122 may include circuitry and/or programming (e.g., code for communicating 1132 stored on the storage medium 1104) adapted to perform several functions relating to, for example, communicating information. In some implementations, the communication involves receiving the information. In some implementations, the communication involves sending (e.g., transmitting) the information.

The information may take different forms in different scenarios. In some aspects, the circuit/module for communicating 1122 may communicate data using a selected set of MCS values. In some aspects, the circuit/module for communicating 1122 may communicate via an NR sidelink.

In some implementations where the communicating involves receiving information, the circuit/module for communicating 1122 receives information (e.g., from the communication interface 1102, the receiver 1116, the memory device 1108, some other component of the apparatus 1100, or some other device), processes (e.g., decodes) the information, and outputs the information to another component of the apparatus 1100 (e.g., the memory device 1108 or some other component). In some scenarios (e.g., if the circuit/module for communicating 1122 includes a receiver), the communicating involves the circuit/module for communicating 1122 receiving information directly from a device that transmitted the information (e.g., via radio frequency signaling or some other type of signaling suitable for the applicable communication medium).

In some implementations where the communicating involves sending information, the circuit/module for communicating 1122 obtains information (e.g., from the memory device 1108 or some other component of the apparatus 1100), processes (e.g., encodes) the information, and outputs the processed information. In some scenarios, the communicating involves sending the information to another component of the apparatus 1100 (e.g., the transmitter 1114, the communication interface 1102, or some other component) that will transmit the information to another device. In some scenarios (e.g., if the circuit/module for communicating 1122 includes a transmitter), the communicating involves the circuit/module for communicating 1122 transmitting the information directly to another device (e.g., the ultimate destination) via radio frequency signaling or some other type of signaling suitable for the applicable communication medium.

The circuit/module for communicating 1122 (e.g., a means for communicating) may take various forms. In some aspects, the circuit/module for communicating 1122 may correspond to, for example, an interface (e.g., a bus interface, a send/receive interface, or some other type of signal interface), a communication device, a transceiver, a transmitter, a receiver, or some other similar component as discussed herein. In some implementations, the communication interface 1102 includes the circuit/module for communicating 1122 and/or the code for communicating 1132. In some implementations, the circuit/module for communicating 1122 and/or the code for communicating 1132 is configured to control the communication interface 1102 (e.g., a transceiver, a receiver, or a transmitter) to communicate the information.

The circuit/module for identifying a set of MCS values 1124 may include circuitry and/or programming (e.g., code for identifying a set of MCS values 1134 stored on the storage medium 1104) adapted to perform several functions relating to, for example, identifying MCS values. In some aspects, the circuit/module for identifying a set of MCS values 1124 (e.g., a means for identifying a set of MCS values) may correspond to, for example, a processing circuit.

The circuit/module for identifying a set of MCS values 1124 may make an identification based on one or more inputs. For example, the circuit/module for identifying a set of MCS values 1124 may identify a set of MCS values from a plurality of sets of MCS values defined for communication with another apparatus. In some aspects, this determination may be based on one or more conditions associated with one or more of the devices (e.g., code rate, modulation order, etc.). Thus, the circuit/module for identifying a set of MCS values 1124 may initially obtain input information (e.g., from the memory device 1108, the communication interface 1102, or some other component of the apparatus 1100). The circuit/module for circuit/module for identifying a set of MCS values 1124 can thus make one or more determinations based on the appropriate input (e.g., as discussed herein in conjunction with FIGS. 1-6). The circuit/module for identifying a set of MCS values 1124 may then output an indication of the identification (e.g., a set of MCS values) to the circuit/module for communicating 1122, the communication interface 1102, the memory device 1108, or some other component of the apparatus 1100.

The circuit/module for identifying a set of minimum and maximum values 1126 may include circuitry and/or programming (e.g., code for identifying a set of minimum and maximum values 1135 stored on the storage medium 1104) adapted to perform several functions relating to, for example, identifying minimum and maximum MCS values (e.g., MCS limits). In some aspects, the circuit/module for identifying a set of minimum and maximum values 1126 (e.g., a means for identifying a set of minimum and maximum values) may correspond to, for example, a processing circuit.

The circuit/module for identifying a set of minimum and maximum values 1126 may make an identification based on one or more inputs. For example, the circuit/module for identifying a set of minimum and maximum values 1126 may determine minimum and maximum values for sets of MCS values to use with an identified set of MCS values. In some aspects, this determination may be based on one or more conditions associated with one or more of the devices (e.g., speed, channel conditions, etc.). Thus, the circuit/module for identifying a set of minimum and maximum values 1126 may initially obtain input information (e.g., from the memory device 1108, the communication interface 1102, or some other component of the apparatus 1100). The circuit/module for circuit/module for identifying a set of minimum and maximum values 1126 can thus make one or more determinations based on the appropriate input (e.g., as discussed herein in conjunction with FIGS. 1-6). The circuit/module for identifying a set of minimum and maximum values 1126 may then output an indication of the determination (e.g., minimum values and maximum values) to the circuit/module for communicating 1122, the communication interface 1102, the memory device 1108, or some other component of the apparatus 1100.

The circuit/module for retrieving 1128 may include circuitry and/or programming (e.g., code for retrieving 1138 stored on the storage medium 1104) adapted to perform several functions relating to, for example, retrieving information from a memory (e.g., the memory device 1108). In some aspects, the circuit/module for retrieving 1128 (e.g., a means for retrieving) may correspond to, for example, a processing circuit.

The circuit/module for retrieving 1128 may retrieve information according to one or more inputs. For example, the circuit/module for retrieving 1128 may retrieve a selected set of MCS values from a plurality of sets of MCS values stored in the memory, where the retrieval is based on an indication of a selected set of MCS values. Thus, the circuit/module for retrieving 1128 may initially obtain input information that identifies a particular set of MCS values (e.g., from the circuit/module for receiving 1120, the memory device 1108, the communication interface 1102, or some other component of the apparatus 1100). The circuit/module for circuit/module for retrieving 1128 can then use the indication to identify a location of the MCS values in a set of MCS values (e.g., as discussed herein in conjunction with FIGS. 1-6). For example, the indication may serve as an index into a table. The circuit/module for retrieving 1128 may then output the retrieved information (e.g., a set of MCS values) to the circuit/module for communicating 1122, the communication interface 1102, the memory device 1108, or some other component of the apparatus 1100.

Third Example Process

Figure 12:
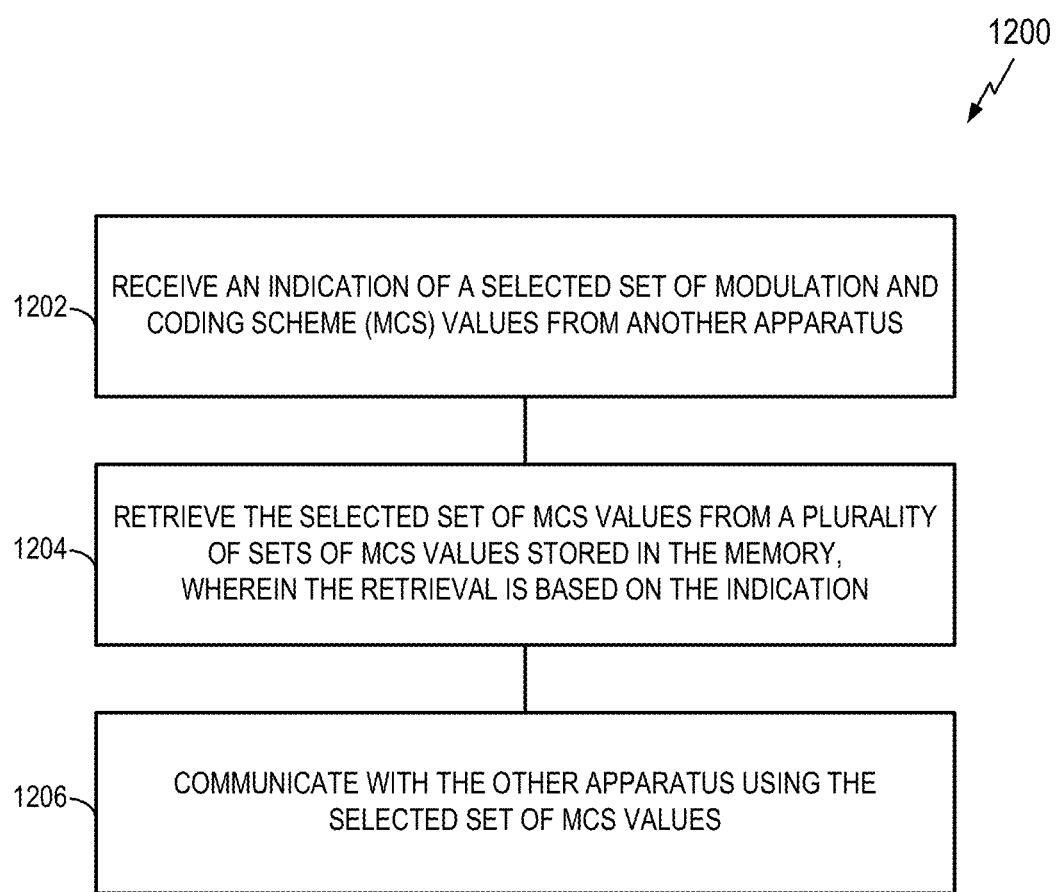
FIG. 12 is a flowchart illustrating an example of a process for using a selected MCS set in accordance with some aspects of the disclosure.

FIG. 12 illustrates a process 1200 for communication in accordance with some aspects of the disclosure. The process 1200 may take place within a processing circuit (e.g., the processing circuit 1110 of FIG. 11), which may be located in a UE, an access terminal, a gNB, a TRP, a base station, or some other suitable apparatus. Of course, in various aspects within the scope of the disclosure, the process 1200 may be implemented by any suitable apparatus capable of supporting communication-related operations.

At block 1202, an apparatus (e.g., a UE) receives an indication of a selected set of modulation and coding scheme (MCS) values from another apparatus. For example, the apparatus may receive the indication sent at block 804 of FIG. 8. In some aspects, the indication may be received via a peer-to-peer control channel, a sidelink control channel, a vehicle-to-anything control channel, or any combination thereof.

The sets of MCS values may take different forms in different implementations. In some aspects, the plurality of sets of MCS values may include a first MCS table and a second MCS table. In some aspects, the first MCS table may support up to a first modulation order; and the second MCS table may support up to a second modulation order that is different from the first modulation order. In some aspects, the first MCS table may support up to 16 quadrature amplitude modulation (QAM); and the second MCS table may support up to 64 QAM. In some aspects, modulation order entries of the first MCS table for MCS index values of 18, 19, and 20 may have a value of 4; and modulation order entries of the second MCS table for MCS index values of 18, 19, and 20 may have a value of 6.

At block 1204, the apparatus retrieves the selected set of MCS values from a plurality of sets of MCS values stored in a memory. In some aspects, the retrieval may be based on the indication received at block 1202.

At block 1206, the apparatus communicates with the other apparatus using the selected set of MCS values. In some aspects, the communication may be via a peer-to-peer data channel, a sidelink data channel, a vehicle-to-anything data channel, or any combination thereof.

In some aspects, a process in accordance with the teachings herein may include any combination of the above operations and/or features.

Fourth Example Process

Figure 13:
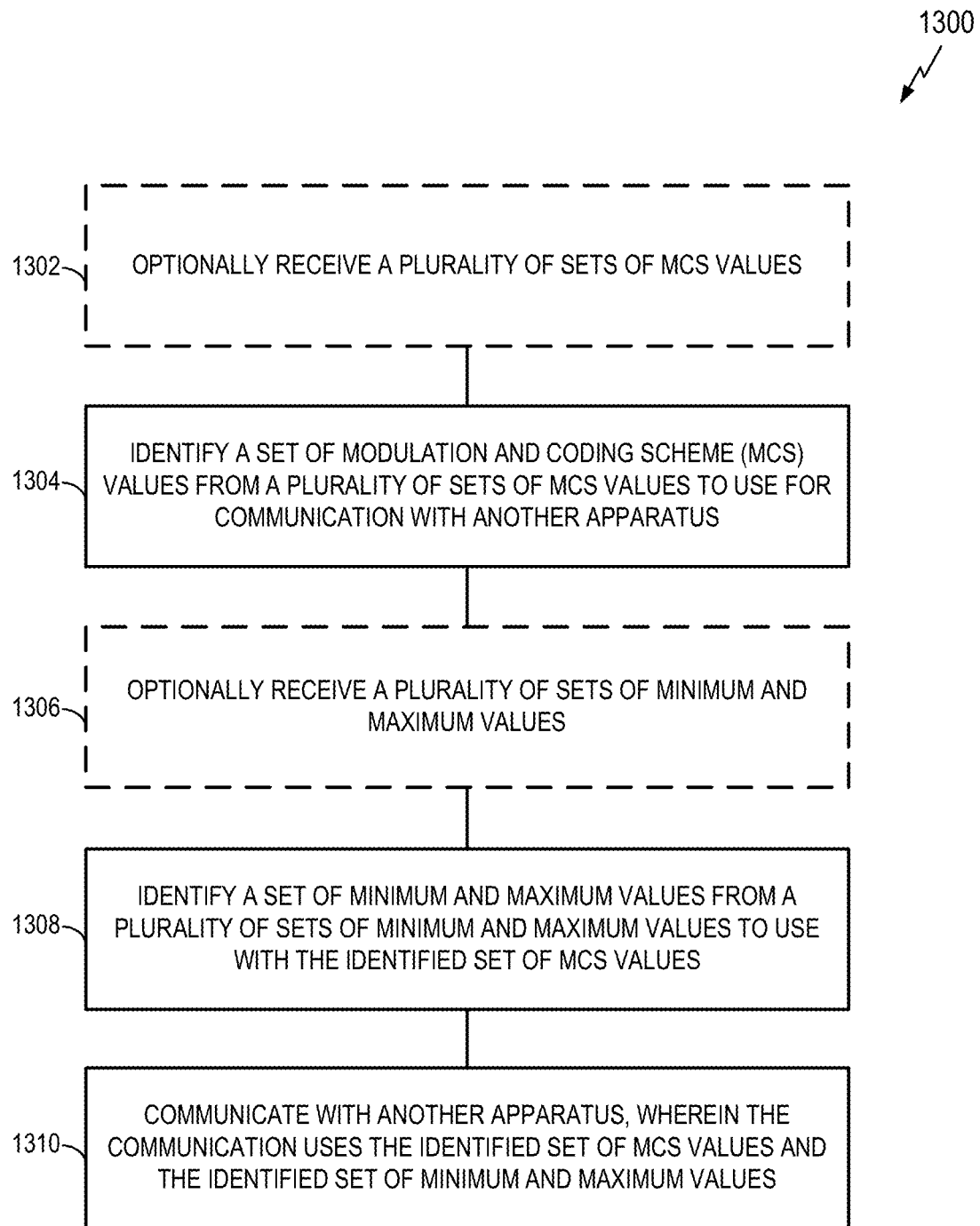
FIG. 13 is a flowchart illustrating an example of a process for using identified minimum and maximum values in accordance with some aspects of the disclosure.

FIG. 13 illustrates a process 1300 for communication in accordance with some aspects of the disclosure. The process 1300 may take place within a processing circuit (e.g., the processing circuit 1110 of FIG. 11), which may be located in a UE, an access terminal, a gNB, a TRP, a base station, or some other suitable apparatus. Of course, in various aspects within the scope of the disclosure, the process 1300 may be implemented by any suitable apparatus capable of supporting communication-related operations.

At optional block 1302, an apparatus (e.g., a UE) may receive a plurality of sets of MCS values. For example, the apparatus may receive this information from a serving gNB.

The sets of MCS values may take different forms in different implementations. In some aspects, the plurality of sets of MCS values may include a first MCS table and a second MCS table. In some aspects, the first MCS table may support up to a first modulation order; and the second MCS table may support up to a second modulation order that is different from the first modulation order. In some aspects, the first MCS table may support up to 16 quadrature amplitude modulation (QAM); and the second MCS table may support up to 64 QAM.

At block 1304, the apparatus identifies a set of modulation and coding scheme (MCS) values from a plurality of sets of MCS values to use for communication with another apparatus. In some aspects, the identification of the set of MCS values may be based on a condition associated with the apparatus. In some aspects, the condition may include a rate of motion (e.g., a translation speed) of the apparatus.

At optional block 1306, an apparatus (e.g., a UE) may receive a plurality of sets of minimum and maximum values. For example, the apparatus may receive the values sent at block 1006 of FIG. 10.

At block 1308, the apparatus identifies a set of minimum and maximum values from a plurality of sets of minimum and maximum values to use with the identified set of MCS values.

At block 1310, the apparatus communicates with another apparatus, wherein the communication uses the identified set of MCS values (from block 1304) and the identified set of minimum and maximum values (from block 1308). In some aspects, the communication may be via a peer-to-peer data channel, a sidelink data channel, a vehicle-to-anything data channel, or any combination thereof.

In some aspects, a process in accordance with the teachings herein may include any combination of the above operations and/or features.

OTHER ASPECTS

The examples set forth herein are provided to illustrate certain concepts of the disclosure. Those of ordinary skill in the art will comprehend that these are merely illustrative in nature, and other examples may fall within the scope of the disclosure and the appended claims.

As those skilled in the art will readily appreciate, various aspects described throughout this disclosure may be extended to any suitable telecommunication system, network architecture, and communication standard. By way of example, various aspects may be applied to 3GPP 5G systems and/or other suitable systems, including those described by yet-to-be defined wide area network standards. Various aspects may also be applied to systems using LTE (in FDD, TDD, or both modes), LTE-Advanced (LTE-A) (in FDD, TDD, or both modes), Universal Mobile Telecommunications System (UMTS), Global System for Mobile Communications (GSM), Code Division Multiple Access (CDMA), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. Various aspects may also be applied to UMTS systems such as W-CDMA, TD-SCDMA, and TD-CDMA. The actual telecommunication standard, network architecture, and/or communication standard used will depend on the specific application and the overall design constraints imposed on the system.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application-specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects.

Likewise, the term "aspect" does not require that all aspects include the discussed feature, advantage or mode of operation. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A first user equipment for communication comprising:
a memory; and
a processor coupled to the memory,
the processor and the memory configured to:
identify a first modulation and coding scheme (MCS) table for a physical sidelink shared channel (PSSCH) from a plurality of sets of MCS tables for sidelink communication, wherein the plurality of sets of MCS tables comprises the first MCS table and a second MCS table;
receive a plurality of sets of minimum and maximum MCS values that are separate from the plurality of sets of MCS tables, wherein the plurality of sets of minimum and maximum MCS values comprises a first set of minimum and maximum MCS values to use with the first MCS table and a second set of minimum and maximum values to use with the second MCS table;
identify the first set of minimum and maximum MCS values from the plurality of sets of minimum and maximum MCS values based on the identification of the first MCS table, wherein the first set of minimum and maximum MCS values comprises a first minimum MCS value to use with the first MCS table and a first maximum MCS value to use with the first MCS table;
send, to a second user equipment via a sidelink control channel, an indication of the first MCS table for the PSSCH identified by the first user equipment from the plurality of sets of MCS tables for sidelink communication; and
communicate via the PSSCH with the second user equipment, wherein the communication via the PSSCH is based on the first MCS table and the first set of minimum and maximum MCS values.

2. The first user equipment of claim 1, wherein the processor and the memory are further configured to:
receive the plurality of sets of MCS tables separately from the plurality of sets of minimum and maximum MCS values.

3. The first user equipment of claim 1, wherein:
the first MCS table supports up to a first modulation order; and
the second MCS table supports up to a second modulation order that is different from the first modulation order.

4. The first user equipment of claim 1, wherein:
the first MCS table supports up to 16 quadrature amplitude modulation (QAM); and
the second MCS table supports up to 64 QAM.

5. The first user equipment of claim 1, wherein the identification of the first MCS table is based on a condition associated with the first user equipment.

6. The first user equipment of claim 5, wherein the condition comprises a rate of motion of the first user equipment.

7. The first user equipment of claim 1, wherein the communication via the sidelink channel is via a peer-to-peer data channel, a sidelink data channel, a vehicle-to-anything data channel, or any combination thereof.

8. A method of communication for a first user equipment, comprising:
identifying a first modulation and coding scheme (MCS) table for a physical sidelink shared channel (PSSCH) from a plurality of sets of MCS tables for sidelink communication, wherein the plurality of sets of MCS tables comprises the first MCS table and a second MCS table;
receiving a plurality of sets of minimum and maximum MCS values that are separate from the plurality of sets of MCS tables, wherein the plurality of sets of minimum and maximum MCS values comprises a first set of minimum and maximum MCS values to use with the first MCS table and a second set of minimum and maximum values to use with the second MCS table;
identifying the first set of minimum and maximum MCS values from the plurality of sets of minimum and maximum MCS values based on the identifying the first MCS table, wherein the first set of minimum and maximum MCS values comprises a first minimum MCS value to use with the first MCS table and a first maximum MCS value to use with the first MCS table;
sending, to a second user equipment via a sidelink control channel, an indication of the first MCS table for the PSSCH identified by the first user equipment from the plurality of sets of MCS tables for sidelink communication; and
communicating via the PSSCH with the second user equipment, wherein the communication via the PSSCH is based on the first MCS table and the first set of minimum and maximum MCS values.

9. The method of claim 8, further comprising:
receiving the plurality of sets of MCS tables.

10. The method of claim 8, wherein:
the first MCS table supports up to a first modulation order; and
the second MCS table supports up to a second modulation order that is different from the first modulation order.

11. The method of claim 8, wherein:
the first MCS table supports up to 16 quadrature amplitude modulation (QAM); and
the second MCS table supports up to 64 QAM.

12. The method of claim 8, wherein the identification of the first MCS table is based on a condition associated with the first user equipment.

13. The method of claim 12, wherein the condition comprises a rate of motion of the first user equipment.

14. The method of claim 8, wherein the communication via the sidelink channel is via a peer-to-peer data channel.

15. The method of claim 8, wherein the communication via the sidelink channel is via a sidelink data channel.

16. The method of claim 8, wherein the communication via the sidelink channel is via a vehicle-to-anything data channel.

17. A first user equipment for communication comprising:
means for identifying a first modulation and coding scheme (MCS) table for a physical sidelink shared channel (PSSCH) from a plurality of sets of MCS tables for sidelink communication, wherein the plurality of sets of MCS tables comprises the first MCS table and a second MCS table;
means for receiving a plurality of sets of minimum and maximum MCS values that are separate from the plurality of sets of MCS tables, wherein the plurality of sets of minimum and maximum MCS values comprises a first set of minimum and maximum MCS values to use with the first MCS table and a second set of minimum and maximum values to use with the second MCS table;
means for identifying the first set of minimum and maximum MCS values from the plurality of sets of minimum and maximum MCS values based on the identifying the first MCS table, wherein the first set of minimum and maximum MCS values comprises a first minimum MCS value to use with the first MCS table and a first maximum MCS value to use with the first MCS table;
means for sending, to a second user equipment via a sidelink control channel, an indication of the first MCS table for the PSSCH identified by the first user equipment from the plurality of sets of MCS tables for sidelink communication; and
means for communicating via the PSSCH with the second user equipment, wherein the communication via the PSSCH is based on the first MCS table and the first set of minimum and maximum MCS values.

18. The first user equipment of claim 17, further comprising:
means for receiving the plurality of sets of MCS tables.

19. A non-transitory computer-readable medium storing computer-executable code for a first user equipment, including code to:
identify a first modulation and coding scheme (MCS) table for a physical sidelink shared channel (PSSCH) from a plurality of sets of MCS tables for sidelink communication, wherein the plurality of sets of MCS tables comprises the first MCS table and a second MCS table;
receive a plurality of sets of minimum and maximum MCS values that are separate from the plurality of sets of MCS tables, wherein the plurality of sets of minimum and maximum MCS values comprises a first set of minimum and maximum MCS values to use with the first MCS table and a second set of minimum and maximum values to use with the second MCS table;
identify the first set of minimum and maximum MCS values from the plurality of sets of minimum and maximum MCS values based on the identification of the first MCS table, wherein the first set of minimum and maximum values comprises a first minimum MCS value to use with the first MCS table and a first maximum MCS value to use with the first MCS table;
send, to a second user equipment via a sidelink control channel, an indication of the first MCS table for the PSSCH identified by the first user equipment from the plurality of sets of MCS tables for sidelink communication; and
communicate via the PSSCH with the second user equipment, wherein the communication via the PSSCH is based on the first MCS table and the first set of minimum and maximum MCS values.

* * * * *